(12) United States Patent
Ye et al.

(10) Patent No.: US 9,899,870 B2
(45) Date of Patent: Feb. 20, 2018

(54) POWER SUPPLY SYSTEM AND METHOD FOR SUPPLYING POWER

(71) Applicant: Delta Electronics (Shanghai) Co., Ltd., Shanghai (CN)

(72) Inventors: Yi-Qing Ye, Shanghai (CN); Wen-Xin Zhang, Shanghai (CN); Chao Yan, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 468 days.

(21) Appl. No.: 14/605,991

(22) Filed: Jan. 26, 2015

(65) Prior Publication Data
US 2015/0214781 A1    Jul. 30, 2015

(30) Foreign Application Priority Data

Jan. 27, 2014 (CN) .......................... 2014 1 0039210

(51) Int. Cl.
H02J 9/00 (2006.01)
H02J 9/06 (2006.01)
H02M 1/10 (2006.01)

(52) U.S. Cl.
CPC .............. H02J 9/061 (2013.01); H02M 1/10 (2013.01); Y10T 307/615 (2015.04); Y10T 307/707 (2015.04)

(58) Field of Classification Search
CPC .................................. H02J 9/061; H02M 1/10
USPC .......................................................... 307/64
See application file for complete search history.

(56) References Cited

U.S. PATENT DOCUMENTS

| | | | |
|---|---|---|---|
| 5,737,204 A * | 4/1998 | Brown | H02J 9/062 323/285 |
| 6,452,289 B1 | 9/2002 | Lansberry et al. | |
| 6,507,507 B2 * | 1/2003 | Tokunaga | H02M 1/4208 307/64 |
| 7,049,711 B2 * | 5/2006 | Kanouda | H02J 9/061 307/66 |
| 7,245,469 B2 * | 7/2007 | Nemoto | H02J 7/027 307/66 |
| 8,203,235 B2 * | 6/2012 | Fox | H02J 9/062 307/64 |

(Continued)

FOREIGN PATENT DOCUMENTS

CN    102769335 A    11/2012
CN    103187788 A    7/2013
(Continued)

*Primary Examiner* — Ryan Jager
(74) *Attorney, Agent, or Firm* — CKC & Partners Co., Ltd.

(57) ABSTRACT

The present disclosure provides a power supply system and a method for supplying power. The power supply system includes an isolating circuit and a first converting circuit. The isolating circuit includes an input terminal and an output terminal. The input terminal of the isolating circuit is configured to connect with a second input source and receive the alternating current or direct current outputted from the second input source. The first converting circuit includes an input terminal and an output terminal. The input terminal of the first converting circuit is configured to connect with a first input source and the output terminal of the isolating circuit. The first converting circuit is configured to convert electricity to output the direct current.

19 Claims, 21 Drawing Sheets

(56) References Cited

U.S. PATENT DOCUMENTS

| | | |
|---|---|---|
| 8,493,757 B2 | 7/2013 | Carletti et al. |
| 2003/0155901 A1 | 8/2003 | Yasumura |
| 2006/0238031 A1* | 10/2006 | Frey .................. H02J 9/061 307/64 |
| 2009/0195075 A1* | 8/2009 | Ziegler ................ H02J 9/06 307/66 |
| 2012/0146587 A1 | 6/2012 | Srinivasan et al. |
| 2013/0020872 A1* | 1/2013 | Kinnard .............. H02J 9/061 307/64 |
| 2013/0246815 A1* | 9/2013 | Uehara ............... H02J 9/061 713/300 |

FOREIGN PATENT DOCUMENTS

| | | |
|---|---|---|
| CN | 103347731 A | 10/2013 |
| JP | H10285830 A | 10/1998 |
| JP | 2009207234 A | 9/2009 |
| TW | 201315094 A1 | 4/2013 |

\* cited by examiner

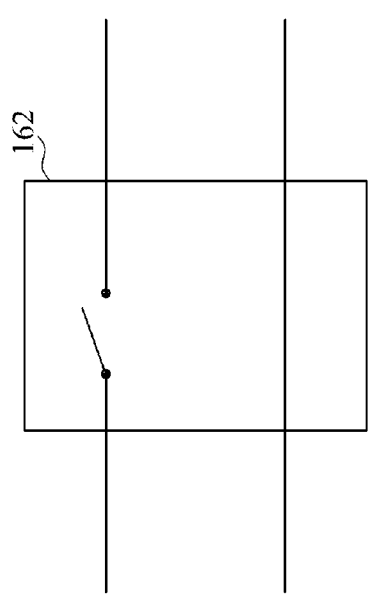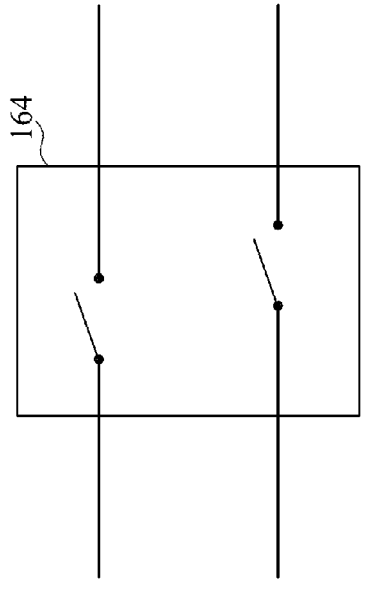
Fig. 7A
Fig. 7B

POWER SUPPLY SYSTEM AND METHOD FOR SUPPLYING POWER

RELATED APPLICATIONS

This application claims priority to China Application Serial Number 201410039210.1, filed Jan. 27, 2014, which is herein incorporated by reference.

BACKGROUND

Field of Invention

The present invention relates to a system and a method. More particularly, the present invention relates to a power supply system and a method for supplying power.

Description of Related Art

With advancements in power converter technology, characteristics such as high power, high efficiency, high power density, enhanced reliability and low cost have gradually become the focus of future development in the area of power converter technology. Moreover, to increase the reliability in power supply use, many electronic devices require the use of an uninterrupted power supply (UPS) to supply electricity. However, the UPS system is expensive and the use thereof is often limited by location, causing inconvenience in its application.

To improve the problems existing in the UPS system and to provide reliability in power supply use, a dual-supply rectifying power supply has been developed. Since the dual-supply rectifying power supply is coupled to two separate isolated power sources at the same time, as long as one of the two power sources can provide electricity, the dual-supply rectifying power supply can supply power to electronic devices, and hence, the dual-supply rectifying power supply can be used as a substitute for the UPS system. Also, the dual-supply rectifying power supply has the characteristics of low cost, compact size and high efficiency, and hence, it is suitable for use as a reliable power supply.

However, as discussed hereinbelow, there are some inconveniences associated with currently available dual-supply rectifying power supplies. To effectively isolate the two inputting power sources, a general dual-supply rectifying power supply will use a switch with a specific specification, such as a relay, to ensure the electrical isolation of the two power sources. However, when using such a mechanical-type switch, since the actuation time thereof is long, it requires a greater capacitance to maintain, resulting in a bigger overall volume of the dual-supply rectifying power supply. Further, such a dual-supply rectifying power supply may only be used with an alternating input source. When it is to receive a direct current input source, a large high-voltage converting switch is required, and as a result, the overall volume of the dual-supply rectifying power supply is increased.

Moreover, in another type of dual-supply rectifying power supply, since an input terminal thereof uses an isolated DC/DC converter, it cannot be compatible with alternating current and direct current at the same time. However, in actual application, the input power source may be an alternating current or direct current, and hence, the application of such a dual-supply rectifying power supply is limited.

In view of the foregoing, there are problems and disadvantages associated with existing products that await further improvement. However, those skilled in the art have been unable to find a solution.

SUMMARY

The following presents a simplified summary of the disclosure in order to provide a basic understanding to the reader. This summary is not an extensive overview of the disclosure and it may not be used to identify key/critical elements of the present invention or delineate the scope of the present invention.

In one aspect, the present disclosure is directed to a power supply system that comprises an isolating circuit and a first converting circuit. The isolating circuit comprises an input terminal and an output terminal. The input terminal of the isolating circuit is configured to connect with a second input source, and receive alternating current or direct current outputted by the second input source. The first converting circuit comprises an input terminal and an output terminal. The input terminal of the first converting circuit is configured to connect with the first input source and the output terminal of the isolating circuit. The first converting circuit is configured to convert electricity to output an outputting direct current.

Another aspect of the present disclosure is directed to a power supply system that is configured to receive alternating current or direct current outputted by the N input sources, wherein said N input sources comprise a first input source and (N−1) second input sources. The power supply system comprises a first converting circuit and (N−1) isolating circuits. The first converting circuit is coupled to the first input source, and is configured to receive and convert the alternating current or direct current outputted by the N input sources into direct current. Each of the (N−1) isolating circuits comprises a converter, wherein the (N−1) second input sources are coupled to the first converting circuit via the (N−1) isolating circuits, such that the first input source is electrically isolated from the (N−1) second input sources. Each of the (N−1) isolating circuits may be operated at a frequency. Said frequency may be equal to or higher than 1 kHz, or the frequency is greater than 50 times the frequency of the alternating current frequency outputted by one of the (N−1) second input sources that is correspondingly coupled to the isolating circuit.

To achieve the above-mentioned purposes, yet another aspect of the present disclosure is directed to method for supplying power. Said method comprises the steps of:

using a first converting circuit to receive the alternating current or direct current outputted by a first input source, and convert the alternating current or the direct current into a first direct current;

using an isolating circuit to selectively isolate the first converting circuit from a second input source;

when the first input source does not output alternating current or direct current, using the isolating circuit to supply the alternating current or direct current outputted by the second input source to the first converting circuit;

using the first converting circuit to convert the alternating current or direct current outputted by the second input source into a second direct current; and when the first input source does not output alternating current or direct current, controlling the first converting circuit to output the second direct current to a load.

In view of the foregoing, embodiments of the present disclosure may provide a power supply system and a method for supplying power to improve the problems existing in the prior art, such as incompatibility of the dual-supply rectifying power supply with alternating current and direct current at the same time to thereby limit the application of such a device. Moreover, the present power supply system and method for supplying power may effectively isolate a plurality of input sources from one another. Therefore, the existing problems caused by the use of a switch of a special specification in a dual-supply rectifying power supply may also be solved. Further, since the power supply system according to embodiments of the present disclosure only requires a single converting circuit, it may further increase the operation efficiency of the element.

These and other features, aspects, and advantages of the present invention, as well as the technical means and embodiments employed by the present invention, will become better understood with reference to the following description in connection with the accompanying drawings and appended claims.

BRIEF DESCRIPTION OF THE DRAWINGS

The invention can be more fully understood by reading the following detailed description of the embodiments, with reference made to the accompanying drawings as follows:

FIG. 7A is a schematic diagram of a switch unit of the power supply system of FIG. 5 according to one embodiment of the present disclosure;

FIG. 7B is a schematic diagram of the switch unit of the power supply system of FIG. 5 according to another embodiment of the present disclosure;

Figure 1:
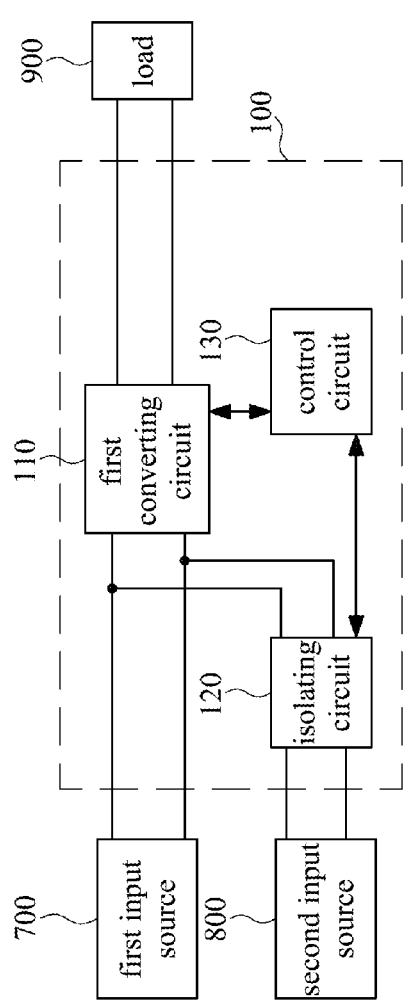
FIG. 1 is a schematic diagram of a power supply system according to one embodiment of the present disclosure.

In accordance with common practice, the various described features/elements are not drawn to scale but instead are drawn to best illustrate specific features/elements relevant to the present invention. Also, wherever possible, like or the same reference numerals are used in the drawings and the description to refer to the same or like parts.

DETAILED DESCRIPTION

The detailed description provided below in connection with the appended drawings is intended as a description of the present examples and is not intended to represent the only forms in which the present examples may be constructed or utilized. The description sets forth the functions of the examples and the steps for constructing and operating the examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include singular forms of the same.

As used herein, the term "couple" or "connect" means that two or more elements are directly or indirectly in physical or electrical contact; or the two or more elements operate or act on/with one another.

FIG. 1 is a schematic diagram of a power supply system 100 according to one embodiment of the present disclosure. As illustrated in FIG. 1, the power supply system 100 comprises a first converting circuit 110, an isolating circuit 120 and a control circuit 130. The isolating circuit 120 comprises an input terminal and an output terminal. The input terminal of said isolating circuit 120 is configured to connect with a second input source 800, and receive an alternating current or direct current outputted by the second input source 800. The first converting circuit 110 comprises a first input terminal, a second input terminal and an output terminal. The first input terminal of the first converting circuit 110 is configured to connect with a first input source 700, while the second input terminal of the first converting circuit 110 is configured to connect with the output terminal of the isolating circuit 120. The first converting circuit 110 is configured to convert electricity into an output direct current.

In one embodiment, the control circuit 130 is connected to the first converting circuit 110 and the isolating circuit 120. The isolating circuit 120 is electrically coupled to the second input source 800 and the first converting circuit 110, and is configured to selectively isolate the first converting circuit 110 from the second input source 800. The first converting circuit 110 is configured to receive and convert the alternating current or direct current outputted by the first input source 700 into a first direct current. When the first input source 700 does not output the alternating current or direct current, the control circuit 130 controls the isolating circuit 120 to supply the alternating current or direct current outputted by the second input source 800 to the first converting circuit 110. The control circuit 130 then controls the first converting circuit 110 to convert the alternating current or direct current outputted by the second input source 800 into a second direct current, and supply the second direct current to a load 900.

In another embodiment, the first converting circuit 110 can be both an AC/DC converting circuit and a DC/DC converting circuit. Hence, regardless of whether the electricity outputted by the first input source 700 is an alternating current or direct current, and regardless of whether the electricity outputted by the second input source 800 is an alternating current or direct current, the first converting circuit 110 can receive the output(s) from the first input source 700 and the second input source 800, and effectively convert the output(s) into a direct current, so as to supply the direct current to the load 900. In this way, the power supply system 100 of the embodiments of the present disclosure may improve the existing problem in which the dual-supply rectifying power supply is not compatible with alternating current and direct current at the same time.

Further, as can be seen clearly in FIG. 1, the isolating circuit 120 is disposed between the first input source 700 and the second input source 800. In this way, the use of the isolating circuit 120 may effectively isolate the first input source 700 and the second input source 800 from each other. Accordingly, the existing problems caused by the use of a switch of a special specification in a dual-supply rectifying power supply may also be solved. Moreover, since the power supply system according to embodiments of the present disclosure may only require a single converting circuit, it may further increase the operation efficiency of the element.

With continued reference to FIG. 1, the control circuit 130 is electrically coupled to the first converting circuit 110 and the isolating circuit 120, and when the first input source 700 does not output the alternating current or direct current, the control circuit 130 is configured to control the first converting circuit 110 to output the second direct current converted from the second input source 800 to the load 900. Accordingly, such operation may ensure that the present power supply system 100 may reliably and continuously supply electricity.

On the other hand, when the first input source 700 outputs an alternating current or direct current normally, the control circuit 130 may first control the first converting circuit 110 to output the first direct current to the load 900.

In one embodiment, when the first input source 700 and the second input source 800 output an alternating current or direct current, the control circuit 130 is configured to control the first converting circuit 110 to convert the alternating current or direct current outputted by the first input source 700 into a first direct current, and to supply the first direct current to the load 900. In other words, the control circuit 130 may prioritize the first input source 700. When the first input source 700 and the second input source 800 both output the alternating current or direct current, the control circuit 130 may first select the first input source 700, and convert the alternating current or direct current into the first direct current, and then supply the first direct current to the load 900. However, the present disclosure is not limited thereto, and such a control configuration is only used to exemplify one implementation of the present disclosure.

Moreover, the control circuit 130 is configured to detect the status of the first input source 700. When the first input source 700 fails or is damaged, the control circuit 130 then controls the second input source 800 to supply electricity to the load 900. In one embodiment, the power supply system 100 may further comprise a detecting circuit (not shown) which is configured to detect the status of the first input source 700. When it is detected that the first input source 700 has suddenly failed or become damaged, the detecting circuit may output an actuating signal to the control circuit 130, and then the control circuit 130 may control the second input source 800 to supply electricity to the load 900.

The isolating circuit 120 may be a high-frequency switching circuit comprising an isolating converter and a switching element. Moreover, the first converting circuit 110 may be an isolation-type converter or non-isolation-type converter. However, the present disclosure is not limited thereto, and the manufacturer can use any suitable element in implementing the isolating circuit 120 and the first converting circuit 110 of the present disclosure depending on actual needs.

In one embodiment, the isolating circuit 120 is operated at a frequency that can be equal to or higher than 1 kHz. In some embodiments, the frequency can be greater than 50 times the frequency of the alternating current outputted by the second input source 800. However, the present disclosure is not limited to such values, and these disclosed values of the frequency for the isolating circuit 120 are provided merely for illustrating embodiments of the present disclosure and any modification thereof that does not depart from the spirit of the present disclosure is deemed to fall within the scope of the claimed invention.

Referring to FIG. 1, the first input terminal of the first converting circuit 110 is coupled to the first input source 700, while an input terminal of the isolating circuit 120 is coupled to the second input source 800, and the output terminal of the isolating circuit 120 is coupled to the second input terminal of the first converting circuit 110. It should be noted that the first input terminal and the second input terminal of the first converting circuit 110 may be the same input terminal, or they can be different input terminals, depending on actual needs.

Figure 2:
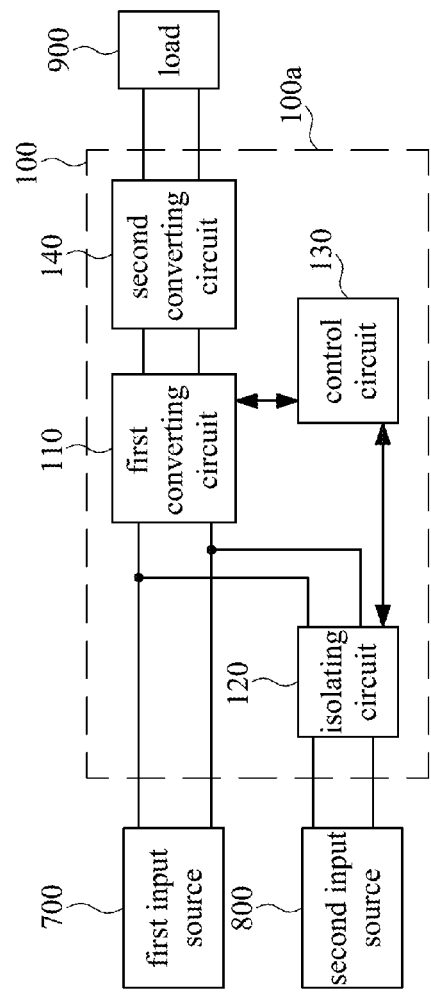
FIG. 2 is a schematic diagram of a power supply system according to another embodiment of the present disclosure.

FIG. 2 is a schematic diagram of a power supply system 100a according to another embodiment of the present disclosure. Compared to the power supply system 100 of FIG. 1, the power supply system 100a further comprises a second converting circuit 140. The second converting circuit 140 is electrically coupled to the first converting circuit 110 and the load 900, so as to convert the first direct current or second direct current outputted by the first converting circuit 110 into an alternating current or direct current and supply to the load 900. In this way, the power supply system 100a according to embodiments of the present disclosure may not only reliably supply direct current to the load 900, but also supply alternating current to the load 900, thereby expanding the field of application of the power supply system 100a.

In the present embodiment, the second converting circuit 140 may be both a DC/DC converting circuit and a DC/AC converting circuit. Accordingly, in practice, the second converting circuit 140 may convert direct current into direct current of a different voltage, and is not limited to converting direct current into an alternating current. Moreover, the second converting circuit 140 may be an isolation-type converting circuit or a non-isolation-type converting circuit, depending on actual needs.

Figure 3:
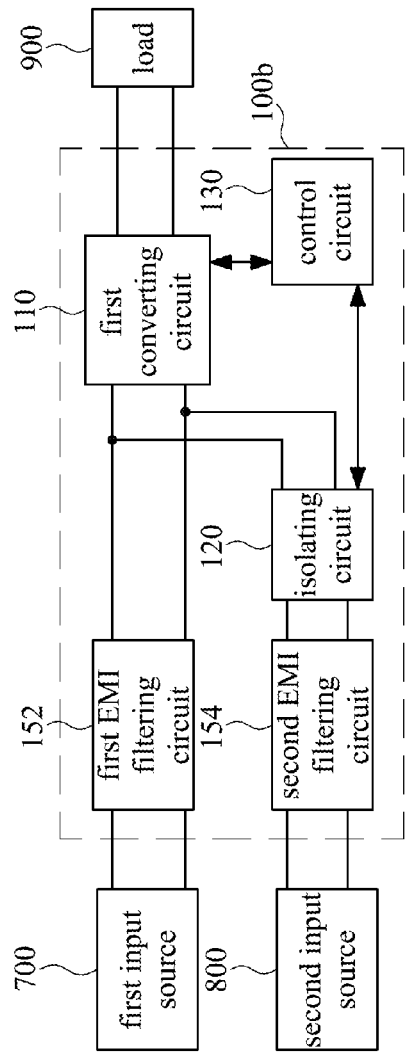
FIG. 3 is a schematic diagram of a power supply system according to yet another embodiment of the present disclosure.

FIG. 3 is a schematic diagram of a power supply system 100b according to yet another embodiment of the present disclosure. Compared to the power supply system 100 of FIG. 1, the power supply system 100b further comprises a first EMI filtering circuit 152 and a second EMI filtering circuit 154. The first EMI filtering circuit 152 is coupled to the first input source 700 and the first converting circuit 110, and is configured to filter the alternating current or direct current outputted by the first input source 700. The second EMI filtering circuit 154 is coupled to the second input source 800 and isolating circuit 120, and is configured to filter the alternating current or direct current outputted by the second input source 800.

The first EMI filtering circuit 152 and the second EMI filtering circuit 154 may be a filtering circuit composed of a common mode inductor, a difference mode inductor and a safety capacitor (X capacitor and Y capacitor), so as to filter electromagnetic interference and comply with the relevant regulations and specifications. However, the present invention is not intended to be limited to the foregoing embodiment.

Figure 4:
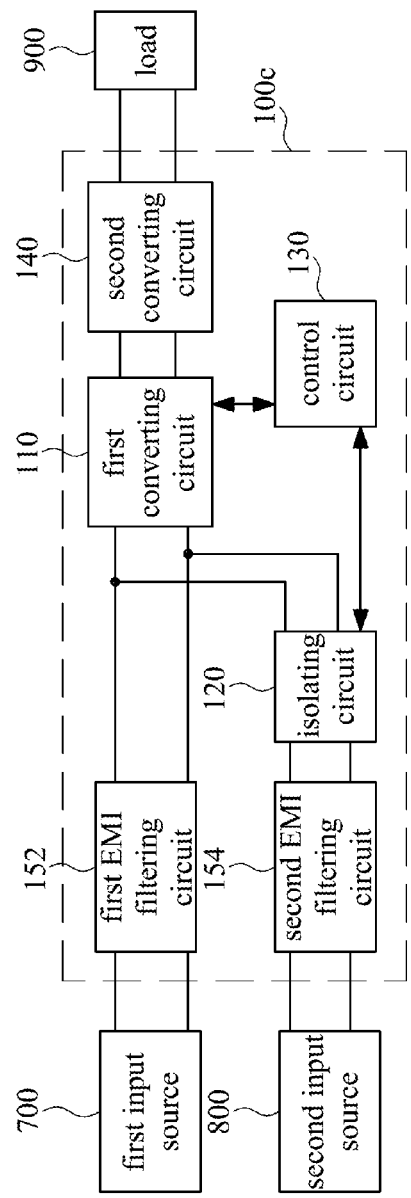
FIG. 4 is a schematic diagram of a power supply system according to still another embodiment of the present disclosure.

FIG. 4 is a schematic diagram of a power supply system 100c according to still another embodiment of the present disclosure. In comparison to the power supply system 100b of FIG. 3, the power supply system 100c further comprises a second converting circuit 140. The electrical connection of the second converting circuit 140 of FIG. 4 is similar to the electrical connection of the second converting circuit 140 of FIG. 2, and for the sake of brevity, a detailed description thereof is omitted herein. Further, the illustration of FIG. 4 is provided to present a different structural arrangement of the power supply system; however, the present disclosure is not limited to the configuration of the power supply system 100c shown in FIG. 4.

Figure 5:
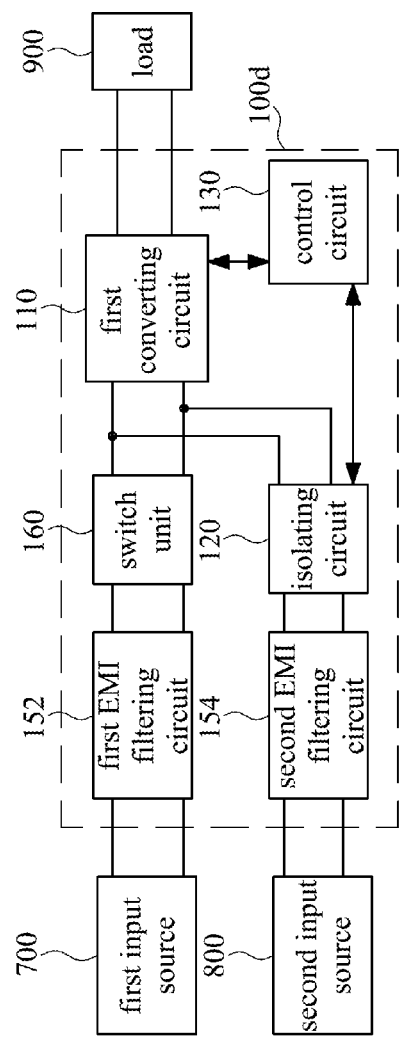
FIG. 5 is a schematic diagram of a power supply system according to another embodiment of the present disclosure.

FIG. 5 is a schematic diagram of a power supply system 100d according to another embodiment of the present disclosure. As compared with the power supply system 100b of FIG. 3, the power supply system 100d further comprises a switch unit 160, in which the switch unit 160 is coupled to the first EMI filtering circuit 152 and the first converting circuit 110; moreover, the switch unit 160 is coupled to the first input source 700 via the first EMI filtering circuit 152. Here, the control circuit 130 is further configured to detect whether the first input source 700 is operating abnormally. When the first input source 700 is operating abnormally, the control circuit 130 turns off the switch unit 160, so as to prevent current from flowing reversely to the first input source 700. However, when the first input source 700 is operating normally, the switch unit 160 is still turned on. The present disclosure is not limited to the configuration illustrated in FIG. 5, and in one embodiment, the switch unit 160 may be coupled to the first converting circuit 110 and the first input source 700.

The switch unit 160 may comprise electronic components and/or mechanical components (e.g., relays). Moreover, the switch unit 160 may comprises fully-controllable components (e.g., Metal-Oxide-Semiconductor Field-Effect Transistors (MOSFETs), Insulated Gate Bipolar Transistors (IGBTs)), half-controllable components (e.g., Silicon Controlled Rectifiers (SCRs)), or non-controllable components (e.g., Transistors)). However, the present disclosure is not limited thereto, and any suitable element may be used in manufacture to implement the present switch unit 160 depending on actual needs.

Figure 7C:
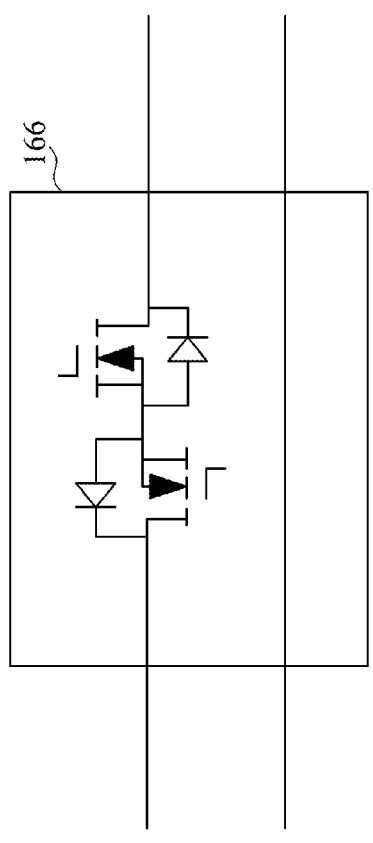
FIG. 7C is a schematic diagram of the switch unit of the power supply system of FIG. 5 according to yet another embodiment of the present disclosure.
Figure 7D:
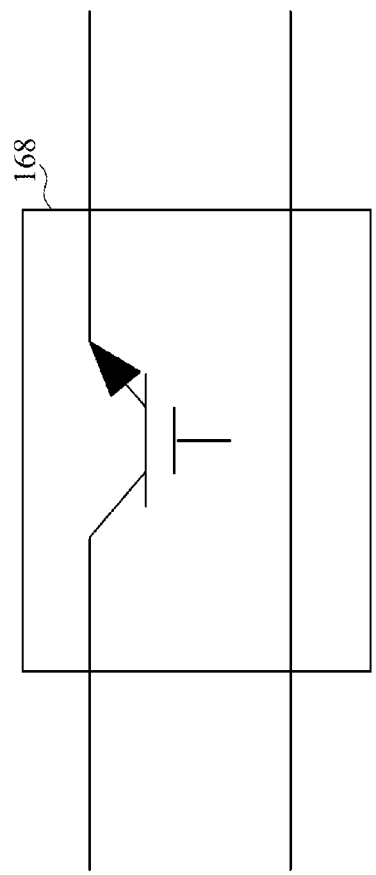
FIG. 7D is a schematic diagram of the switch unit of the power supply system of FIG. 5 according to still another embodiment of the present disclosure.

Several embodiments of the switch unit 160 are illustrated in FIG. 7A to FIG. 7D. As illustrated in FIG. 7A and FIG. 7B, the switch unit 160 may be composed of mechanical components, while as illustrated in FIG. 7C and FIG. 7D, the switch unit 160 may be composed of electronic components, but the present disclosure is not limited to this. When the switch unit 160 is composed of electronic components, the switch unit 160 may be the device illustrated in FIG. 7C, which is composed of fully-controllable components, for example, MOSFETs; moreover, the switch unit 160 may be the device illustrated in FIG. 7D, which is composed of fully-controllable components, for example, Bipolar Junction Transistors (BJTs). However, the present disclosure is not limited thereto, and the structure used to form the switch unit 160 can be determined depending on actual needs.

Figure 6:
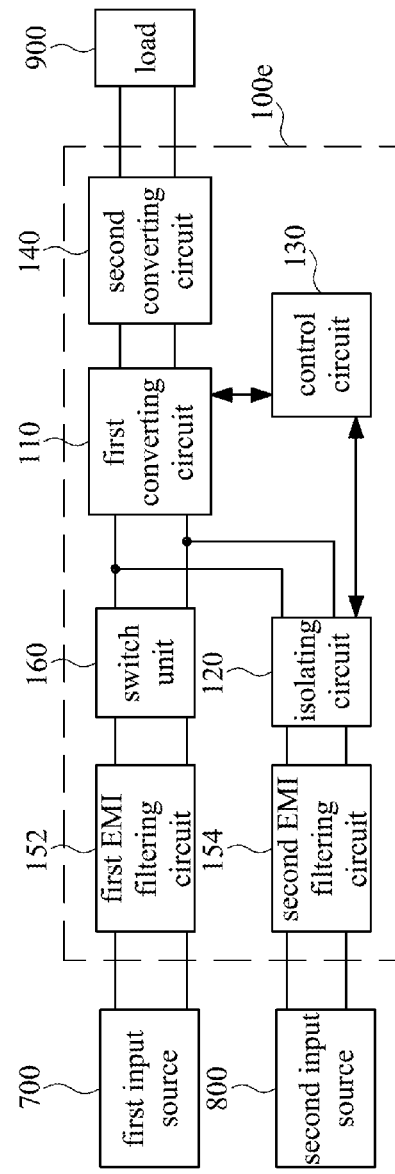
FIG. 6 is a schematic diagram of a power supply system according to yet another embodiment of the present disclosure.

Reference is made to FIG. 6 which is a schematic diagram of a power supply system 100e according to yet another embodiment of the present disclosure. Compared with the power supply system 100d of FIG. 5, the power supply system 100e further comprises a second converting circuit 140. The electrical connection of the second converting circuit 140 of FIG. 6 is similar to the electrical connection of the second converting circuit 140 of FIG. 2, and for the sake of brevity, a detailed description thereof is omitted herein. Further, the illustration of FIG. 6 is provided to present a different structural arrangement of the present power supply system. The present disclosure is not limited to the configuration of the power supply system 100e shown in FIG. 6.

Figure 8:
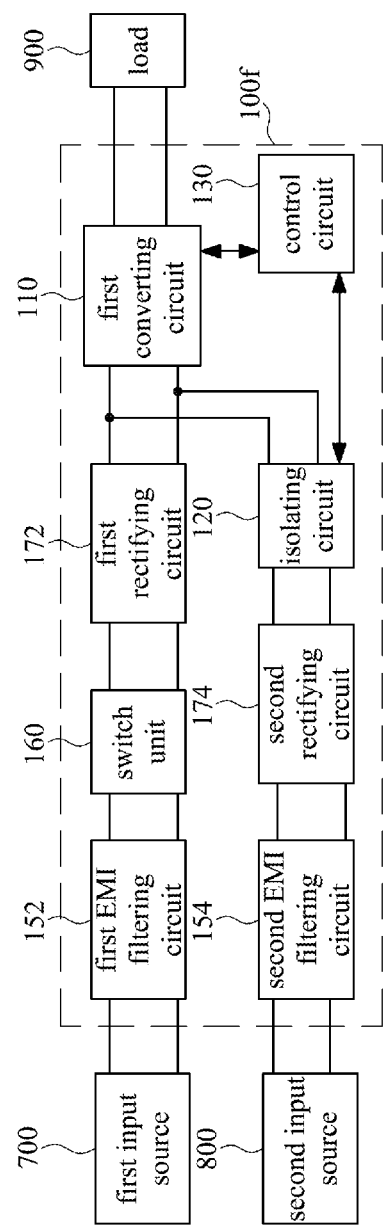
FIG. 8 is a schematic diagram of a power supply system according to one embodiment of the present disclosure.

Reference is now made to FIG. 8 which is a schematic diagram of a power supply system 100f according to still another embodiment of the present disclosure. As compared with the power supply system 100d of FIG. 5, the power supply system 100f further comprises a first rectifying circuit 172 and a second rectifying circuit 174. The first rectifying circuit 172 is coupled to the switch unit 160 and the first converting circuit 110; meanwhile, the first rectifying circuit 172 is coupled to the first input source 700 through the switch unit 160, and is configured to rectify the alternating current outputted by the first input source 700. The second rectifying circuit 174 is coupled to the second EMI filtering circuit 154 and the isolating circuit 120; meanwhile, the second rectifying circuit 174 is coupled to the second input source 800 via the second EMI filtering circuit 154, and is configured to rectify the alternating current outputted by the second input source 800.

In the present embodiment, the first converting circuit 110 may be both a DC/DC converting circuit and a DC/AC converting circuit. However, the present disclosure is not limited thereto, and said arrangement is only one embodiment for implementing the present disclosure.

Figure 9:
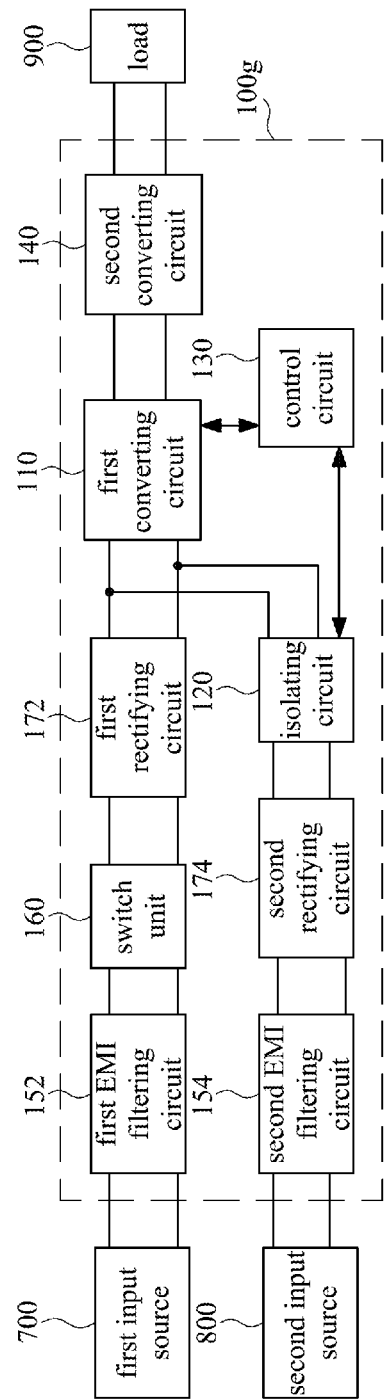
FIG. 9 is a schematic diagram of a power supply system according to another embodiment of the present disclosure.

FIG. 9 is a schematic diagram of a power supply system 100g according to another embodiment of the present disclosure. In comparison with the power supply system 100f of FIG. 8, said power supply system 100g further comprises a second converting circuit 140. The electrical connection of the second converting circuit 140 of FIG. 9 is similar to the electrical connection of the second converting circuit 140 of FIG. 2, and for the sake of brevity, a detailed description thereof is omitted herein. Further, the illustration of FIG. 9 is provided to present a different structural arrangement of the present power supply system. The present disclosure is not limited to the configuration of the power supply system 100g shown in FIG. 9.

Figure 10A:
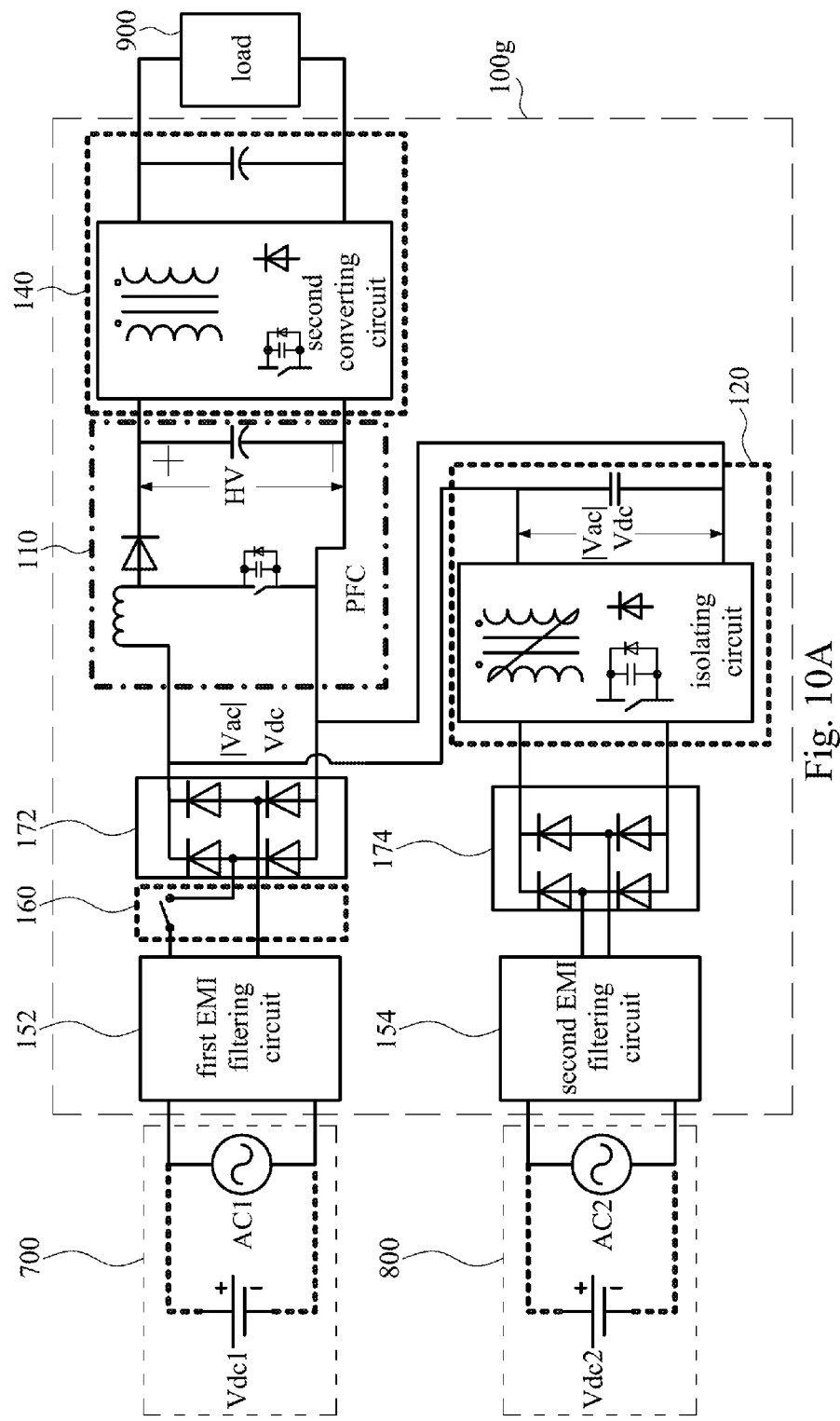
FIG. 10A is a schematic circuit diagram of the power supply system of FIG. 9 according to one embodiment of the present disclosure.

FIG. 10A is a schematic circuit diagram of the power supply system 100g of FIG. 9 according to one embodiment of the present disclosure. As illustrated in FIG. 10A, the first converting circuit 110 may be a single boost circuit, the isolating circuit 120 and the second converting circuit 140 may be an LLC resonant converter, the switch unit 160 may be composed of mechanical components, and the first rectifying circuit 172 and the second rectifying circuit 174 may be a full-bridge rectifying circuit, but the present disclosure is not limited to this, for example, the isolating circuit 120 and the second converting circuit 140 may also be a phase-shift full-bridge converter or any other converter. In FIG. 10A, the first input source 700 and the second input source 800 are illustrated to show that the first input source 700 may be an alternating current input source AC1 or a direct current input source Vdc1, and the second input source 800 may be an alternating current input source AC2 or a direct current input source Vdc2.

In the present embodiment, the first converting circuit 110 may receive an alternating current or direct current, and the output of the first converting circuit 110 is a direct current; moreover, the isolating circuit 120 may receive a direct current, and the output of the isolating circuit 120 is also a direct current. Further, the isolating circuit 120 may output voltage with or without regulation, and therefore, the power supply system 100g may be operated in different ways as discussed below.

In this embodiment, firstly, a control circuit 130 controls a second input source 800 to output energy via a isolating circuit 120 to a load 900. In this case, when the second input source 800 supplies direct current, and the isolating circuit 120 is a non-regulated or a fixed ratio converter, and the first converting circuit 110 needs to regulate the direct current supplied from the second input source 800. In another embodiment, when the second input source 800 supplies the direct current and the isolating circuit 120 regulates the output voltage, since the voltage has been regulated by the isolating circuit 120, the first converting circuit 110 may not operate. In other words, the switch of the first converting circuit 110 may be in the OFF state, and the output from the isolating circuit 120 is supplied to the second converting circuit 140 via the inductor and diode of the first converting circuit 110.

However, it should be noted that in the present embodiment, although the voltage has been regulated by the isolating circuit 120, the first converting circuit 110 may still further regulate the voltage. Furthermore, when the second input source 800 outputs an alternating current, after high-frequency isolation, the outputted current may be a current waveform after rectification. At this time, to correct the power factor of the rectified current waveform, the first converting circuit 110 may need to operate.

Figure 10B:
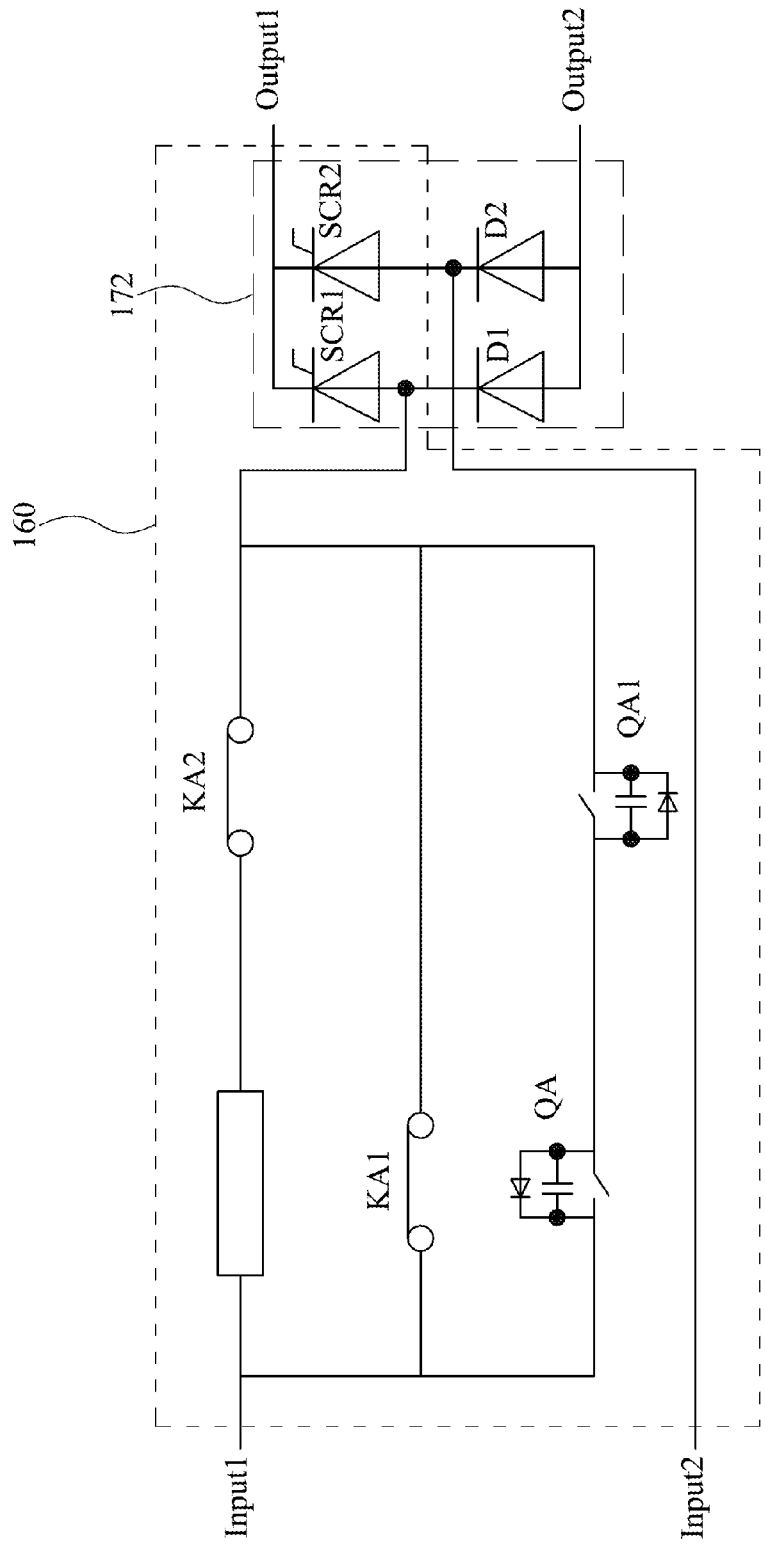
FIG. 10B is a schematic circuit diagram of a switch unit and a first rectifying circuit of FIG. 10A according to one embodiment of the present disclosure.

FIG. 10B is a schematic circuit diagram of the switch unit 160 and the first rectifying circuit 172 according to one embodiment of the present disclosure. It should be noted that in FIG. 10A, a portion of the circuit of the first rectifying circuit 172 may be shared by the switch unit 160 and the first rectifying circuit 172, details of which may be shown in FIG. 10B.

As illustrated in FIG. 10B, the silicon-controlled rectifier SCR1 and silicon-controlled rectifier SCR2 of the first rectifying circuit 172 may belong to the switch unit 160. The silicon-controlled rectifiers SCR1, SCR2 may be used as a switch which may comprise a mechanical switch and/or an electric switch. Moreover, the silicon-controlled rectifiers SCR1, SCR2 may also belong to the first rectifying circuit 172. In the first rectifying circuit 172, the silicon-controlled rectifiers SCR1, SCR2 can perform rectification, and hence function as rectifiers. In this way, since a portion of the circuit of the first rectifying circuit 172 may be shared by two components, so the operational efficiency of the power supply system 100g may be increased.

Figure 11:
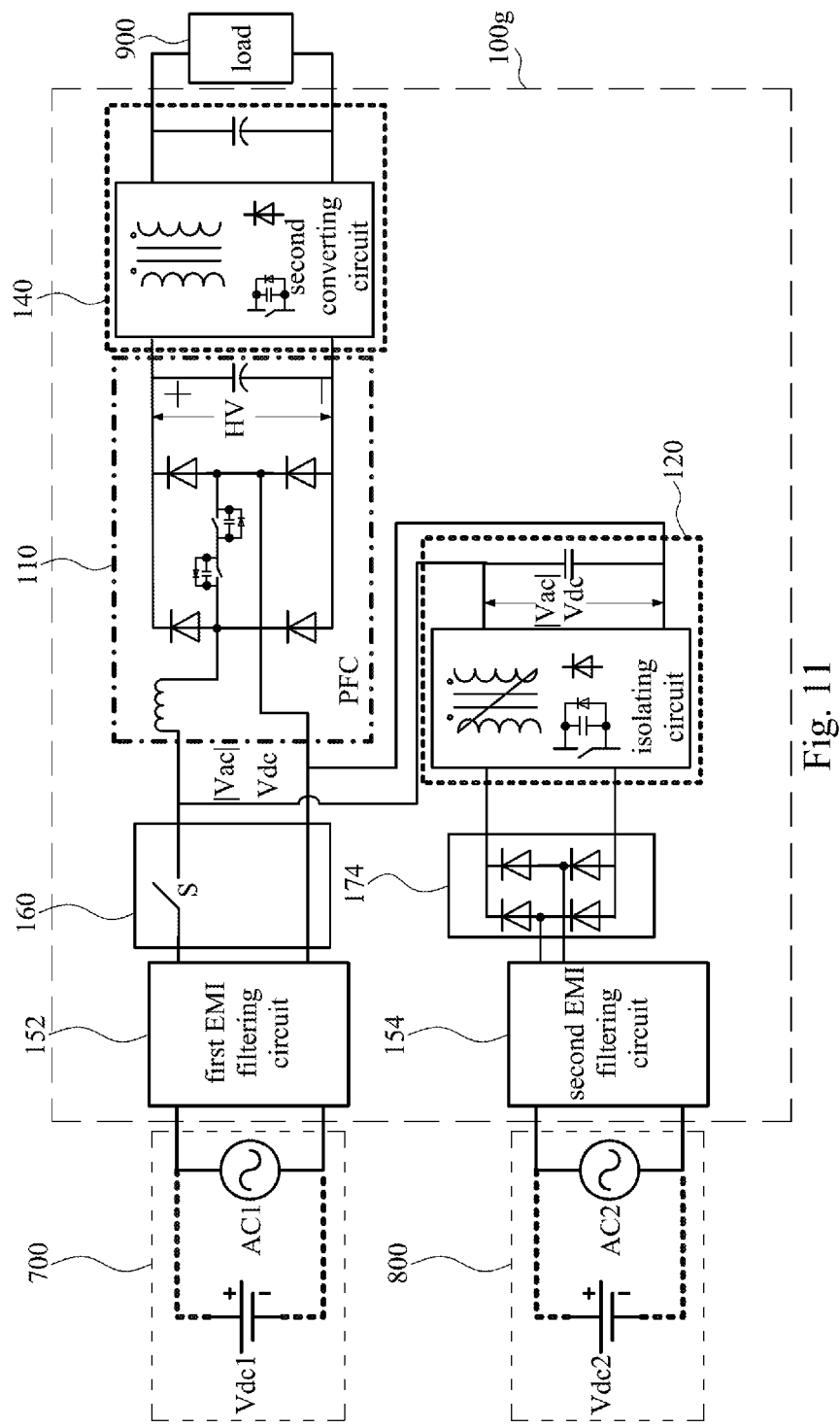
FIG. 11 is a schematic circuit diagram of the power supply system of FIG. 9 according to another embodiment of the present disclosure.

FIG. 11 is a schematic circuit diagram of the power supply system according to another embodiment of the present disclosure. In comparison with the power supply system 100g of FIG. 10A, the power supply system 100g in FIG. 11 may not require additional rectifying circuits because the rectifying circuit has been incorporated into the first converting circuit 110. However, the present disclosure is not limited thereto, and the first converting circuit 110 may also be a Power Factor Correction (PFC) circuit without a rectifying circuit, etc.

Figure 12:
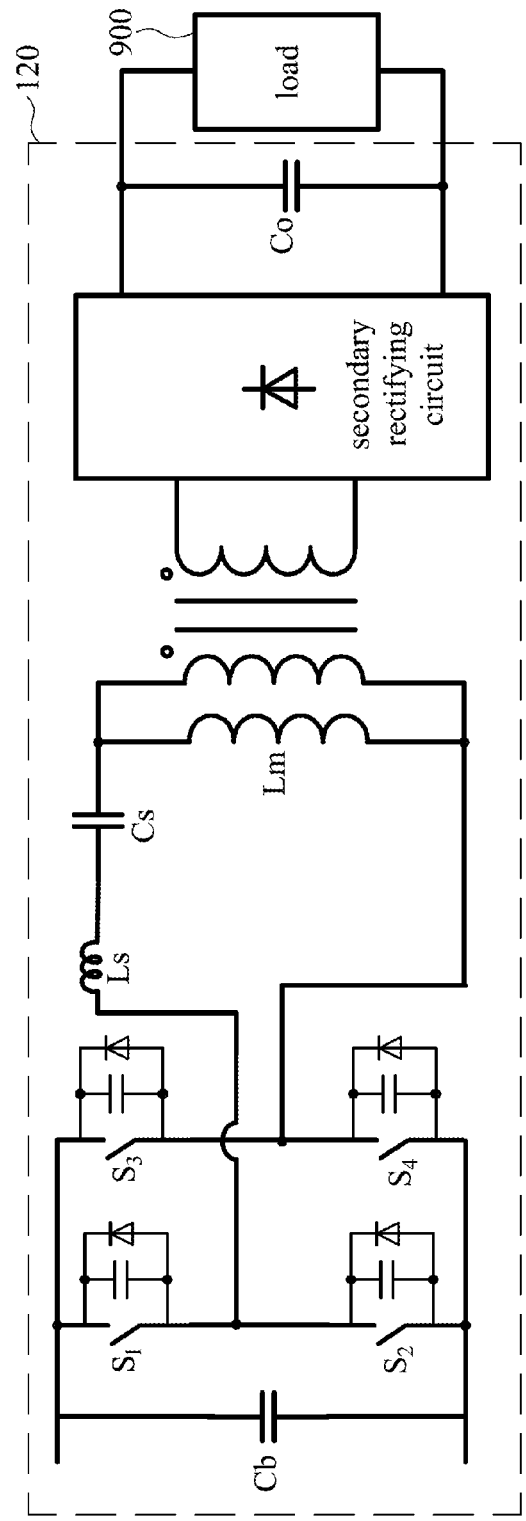
FIG. 12 is a schematic circuit diagram of an isolating circuit of a power supply system according to one embodiment of the present disclosure.

FIG. 12 is a schematic diagram of the isolating circuit 120 of the power supply system 100 according to one embodiment of the present disclosure. As illustrated in FIG. 12, the isolating circuit 120 may be a full-bridge LLC series circuit resonant converter which may improve the efficiency of the power supply system 100. Moreover, the secondary rectifying circuit may be implemented by using diode rectification, synchronous rectification, full-bridge rectification, full-wave rectification, etc., depending on actual needs. Moreover, the full-bridge LLC series circuit resonant converter may be a regulation-type or non-regulation-type of device. When the full-bridge LLC series circuit resonant converter is a regulation-type of device, the full-bridge LLC series circuit resonant converter may control the primary switch of the transformer, such as switches S1~S4, so that the switching frequency of the primary switch is varied within a specific range to thereby adjust the output voltage value. When the full-bridge LLC series circuit resonant converter is a non-regulated or a fixed ratio converter, the first switch of full-bridge LLC series circuit resonant converter can use a fixed switching frequency. In this case, the full-bridge LLC series circuit resonant converter may only act as an isolator, and may not regulate the output voltage. Moreover, the isolating circuit 120 may also be an isolation-type DC/DC converter, such as a half-bridge LLC, phase-shift full-bridge converter, forward or flyback converter, etc., depending on actual needs.

Figure 13:
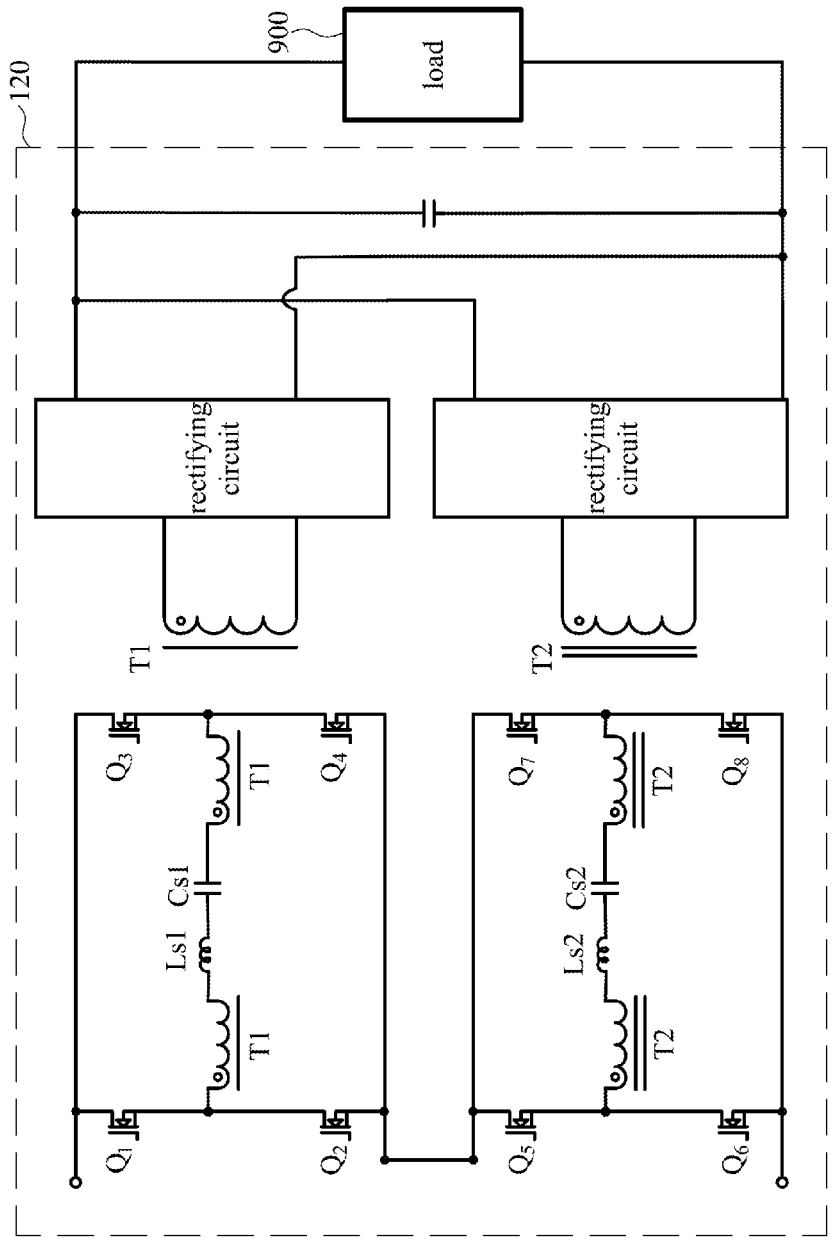
FIG. 13 is a schematic circuit diagram of an isolating circuit of a power supply system according to another embodiment of the present disclosure.
Figure 14:
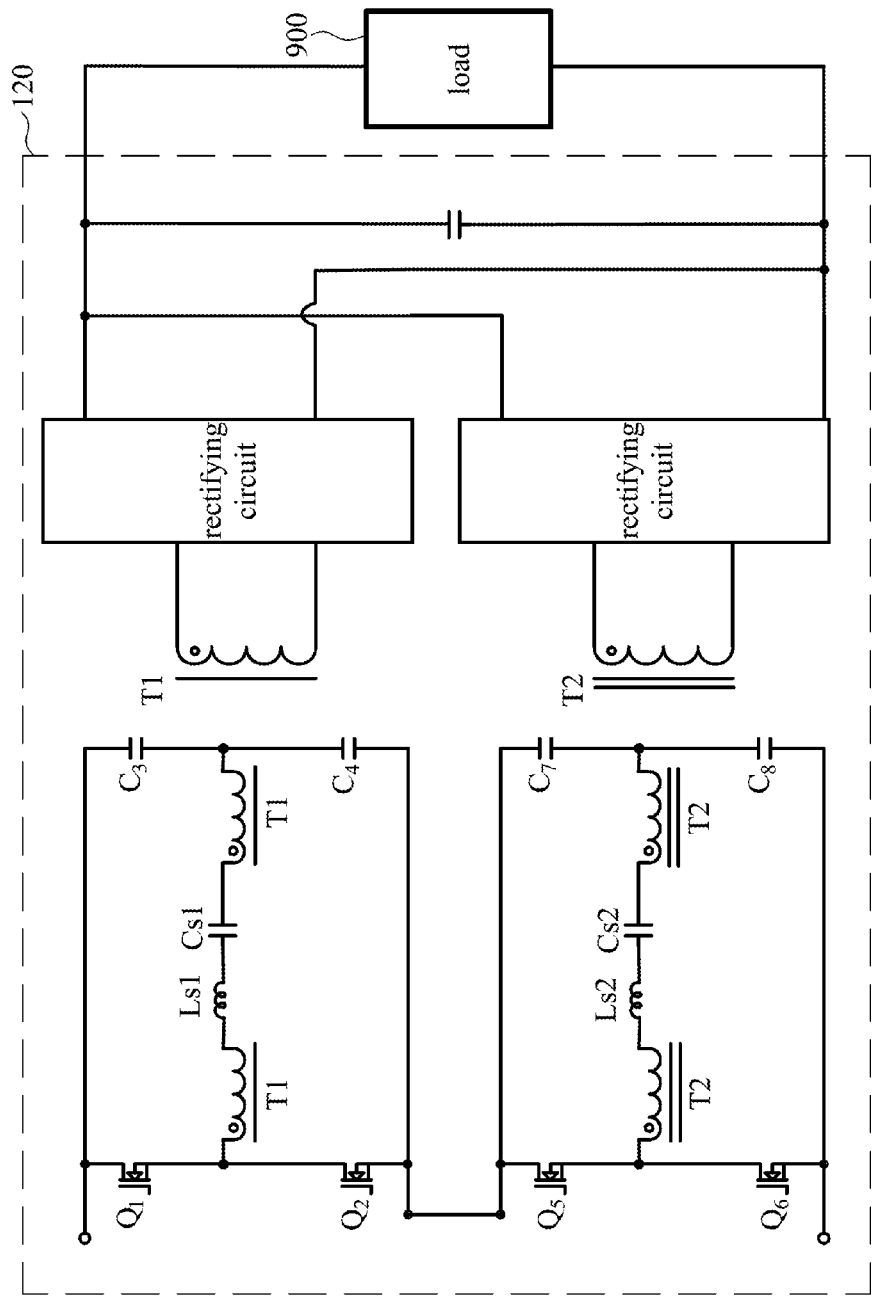
FIG. 14 is a schematic circuit diagram of an isolating circuit of a power supply system according to yet another embodiment of the present disclosure.

FIG. 13 is a schematic diagram of the isolating circuit 120 of the power supply system 100 according to one embodiment of the present disclosure. FIG. 14 is a schematic diagram of the isolating circuit 120 of the power supply system according to another embodiment of the present disclosure. As illustrated in FIG. 13, the isolating circuit 120 may be a full-bridge LLC resonant converter, while as illustrated in FIG. 14, the isolating circuit 120 may be a half-bridge LLC resonant converter. In FIG. 13 and FIG. 14, the primary sides of transformers of the isolating circuit 120 are coupled in series and the secondary sides of transformers of the isolating circuit 120 are coupled in parallel. In other words, the isolating circuit 120 is provided in a primary-in-series-secondary-in-parallel arrangement. Since the isolating circuit 120 is primary-in-series the isolating circuit 120 may use low-voltage component at the primary side, and thus the cost may be reduced. Moreover, by using the primary-in-series-secondary-in-parallel structure, the output of the two transformers will have almost same output current. In another embodiment, by applying interleaving control, secondary output ripple may be greatly reduced; therefore, the volume of the output filter and the number of filtering capacitors may be reduced. The primary-in-series structure may be used with respect to high-voltage input. However, the present disclosure is not limited thereto, and the manufacturer can use any suitable means in implementing the present isolating circuit 120, such as using a primary-in-parallel-secondary-in-series full-bridge LLC resonant converter to implement the isolating circuit 120, etc.

Figure 15:
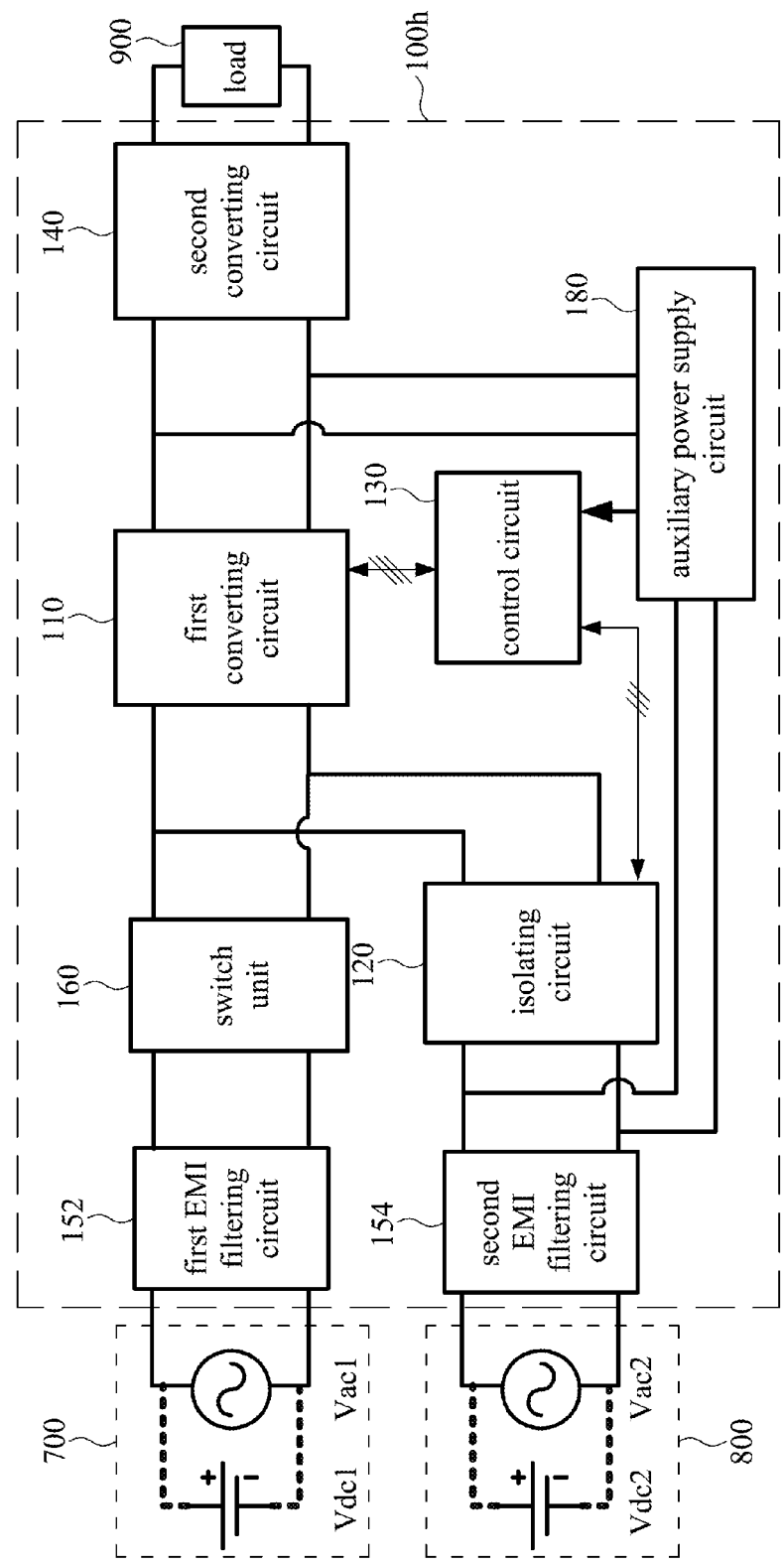
FIG. 15 is a schematic diagram of a power supply system according to still another embodiment of the present disclosure.

FIG. 15 is a schematic diagram of a power supply system 100h according to another embodiment of the present disclosure. As compared to the power supply system 100d of FIG. 5, the power supply system 100h further comprises an auxiliary power supply circuit 180. The auxiliary power supply circuit 180 is coupled to the output terminal of the first converting circuit 110, the first input source 700, the second input source 800, the switch unit 160, the first EMI filtering circuit 152 or the second EMI filtering circuit 154, and is configured to supply electricity to the control circuit 130, but the present disclosure is not limited to this. The auxiliary power supply circuit 180 may use two or more auxiliary power sources, and each auxiliary power supply circuit 180 may have multiple isolating outputs, i.e. multi-output circuit. The output terminal of each auxiliary power supply circuit 180 may supply electricity independently; alternatively, the output terminal of each auxiliary power supply circuit 180 may be electrically coupled with each other so as to jointly supply electricity to the control circuit 130, but the present disclosure is not limited to this. This embodiment is not intended to limit the present disclosure, which is provided as an example to illustrate one implementation of the present invention. Any modification to such an implementation that does not depart from the spirit of the present disclosure is deemed to fall within the scope of the present disclosure.

Figure 16:
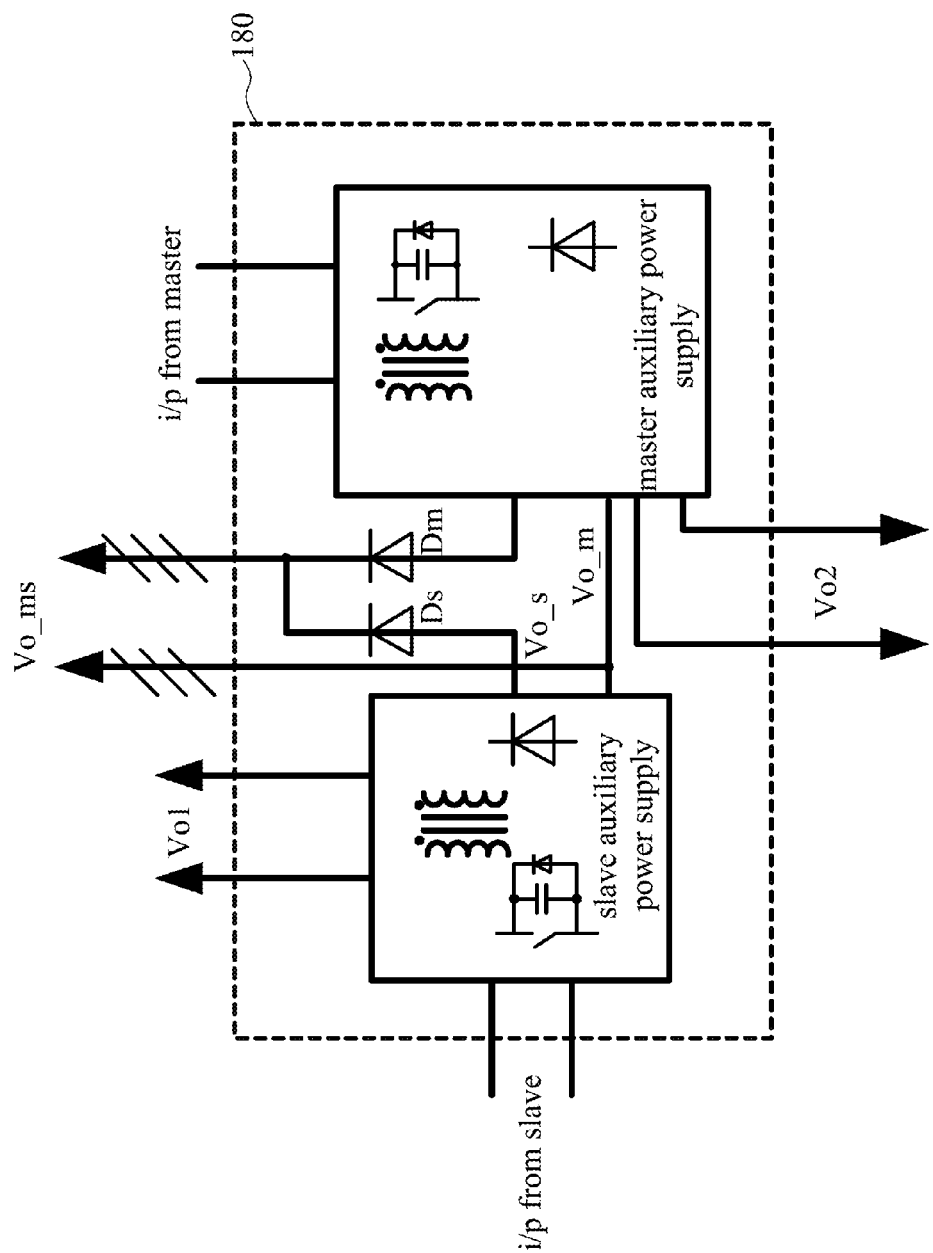
FIG. 16 is a schematic circuit diagram of an auxiliary power supply circuit of the power supply system of FIG. 15 according to one embodiment of the present disclosure.

FIG. 16 is a schematic diagram of the auxiliary power supply circuit 180 of the power supply system 100h illustrated in FIG. 15 according to one embodiment of the present disclosure. As illustrated in FIG. 16, the auxiliary power supply circuit 180 comprises two auxiliary power sources, which are the master auxiliary power supply and the slave auxiliary power supply, respectively. The master auxiliary power supply is coupled to the output terminal of the first converting circuit 110, the first input source 700 or the second input source 800; moreover, the slave auxiliary power supply is coupled to the first EMI filtering circuit 152, the second EMI filtering circuit 154, the first rectifying circuit 172, the second rectifying circuit 174 or the switch unit 160, but the present disclosure is not limited to this. The master auxiliary power supply may receive the output voltage from the first converting circuit 110, or the alternating current or direct current outputted by the first input source 700 or the second input source 800, whereas the slave auxiliary power supply may receive the output voltage from the first or second EMI filtering circuits 152, 154 or the output voltage from the first or second rectifying circuits 172, 174. Each of the master auxiliary power supply and the slave auxiliary power supply may be a multiple-output isolating converter, for example, a flyback converter or forward converter.

In one embodiment, the master auxiliary power supply and the slave auxiliary power supply may have the same power level, and may have the same number or different numbers of outputs. When the number of outputs of the master auxiliary power supply and the slave auxiliary power supply are the same, the corresponding outputs (e.g., Vo_s and Vo_m) may couple via the diode (e.g., Ds, Dm), thereby forming a single output Vo_ms. In another embodiment, when the number of outputs of the master auxiliary power supply is greater than that of the slave auxiliary power supply, part of the electricity may be supplied by the master auxiliary power supply alone (e.g., Vo2), while the remaining portion of the electricity may be supplied by the slave auxiliary power supply to supply (e.g., Vo1). However, the electricity to core components of the power supply system 100h may be supplied by the common output Vo_ms of the master auxiliary power supply and the slave auxiliary power supply. In one embodiment, at least one output terminal of the master auxiliary power supply is connected in parallel with at least one output terminal of the slave auxiliary power supply so as to supply the electricity to control circuit 130. But the present disclosure is not limited to this.

The above-mentioned power supply system 100~100h may be directed to configurations involving two input electric sources, but the present disclosure is not limited thereto. To further ensure the reliability of the power supply system 100~100h, a power supply system 200 capable of receiving N input sources is disclosed. The power supply system 200 is illustrated in FIG. 17 to FIG. 22.

Figure 17:
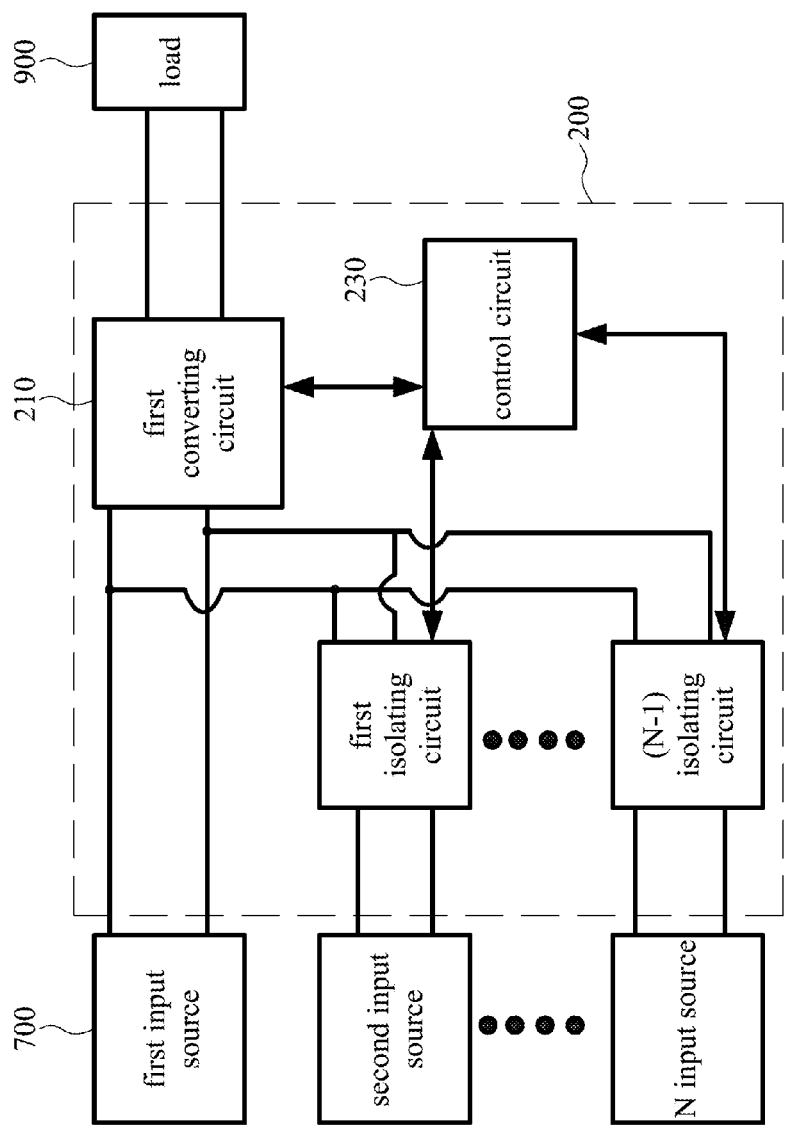
FIG. 17 is a schematic diagram of a power supply system according to one embodiment of the present disclosure.

FIG. 17 is a schematic diagram of a power supply system 200 according to one embodiment of the present disclosure. As illustrated in FIG. 17, the power supply system 200 is configured to receive alternating current or direct current outputted by N input sources, wherein the N input sources comprises a first input source 700 and (N−1) remaining input sources. The power supply system 200 comprises a first converting circuit 210, (N−1) isolating circuits and a control circuit 230. The first converting circuit 210 is coupled to the first input source 700.

Moreover, each of the (N−1) isolating circuits comprises a converter. The (N−1) remaining input sources are coupled to the first converting circuit 210 respectively via the (N−1) isolating circuits, such that the first input source 700 is electrically isolated from the (N−1) remaining input sources. Each of the (N−1) isolating circuits may be operated at a frequency, in which the frequency may be equal to or higher than 1 kHz, or the frequency is greater than 50 times the frequency of the alternating current outputted by one of the (N−1) second input sources that is correspondingly coupled to one of the (N−1) isolating circuit, but the present disclosure is not limited to this. The first converting circuit 210 is configured to receive and convert the alternating current or direct current outputted by the N input sources into a direct current.

In the present embodiment, the first converting circuit 210 may be both an AC/DC converting circuit and a DC/DC converting circuit; therefore, regardless of whether the electricity outputted by the first input source 700 is an alternating current or direct current, and regardless of whether the electricity outputted by the remaining input sources is an alternating current or direct current, the first converting circuit 210 can receive the output(s) from the first input source 700 and the remaining input sources, and effectively convert the output(s) into a direct current, so as to supply the direct current to the load 900. The power supply system 200 may be more reliable, because the power supply system 200 may receive the output voltage from N input sources. That is, as long as one of the N input sources can output the voltage normally, the power supply system 200 can supply electricity to the load 900 normally.

Furthermore, as shown in FIG. 17, there are (N−1) isolating circuits between the first input source 700 and the remaining input sources. In this way, the (N−1) isolating circuits can effectively isolate the first input source 700 from the remaining input sources. Therefore, the existing problems caused by the use of a switch of a special specification in dual-supply rectifying power supplies may also be solved. Further, since the power supply system 200 may only require a single converting circuit, it may further increase the operation efficiency of the element.

In one embodiment, the power supply system 200 further comprises a control circuit 230. The control circuit 230 is coupled to the first converting circuit 210 and (N−1) isolating circuits, wherein when the first input source 700 does not output alternating current or direct current, the control circuit 230 controls the first converting circuit 210 to receive alternating current or direct current outputted from the (N−1) remaining input sources via the (N−1) isolating circuits, and controls the first converting circuit 210 to convert the alternating current or direct current outputted by the (N−1) remaining input sources into a direct current and supply the direct current to the load 900. In this way, even if the first input source 700 is failed or damaged and cannot output alternating current or direct current, the power supply system 200 may still supply electricity to the load 900 from the (N−1) remaining input sources, so as to ensure that the power supply system 200 can reliably and continuously supply electricity.

On the other hand, when the first input source 700 outputs alternating current or direct current normally, the control circuit 230 may first control the first input source 700 to output the direct current to the load 900 via the first converting circuit 210. Moreover, the control circuit 230 is configured to detect the status of the first input source 700. When the first input source 700 has suddenly failed or become damaged, the control circuit 230 then controls the (N−1) remaining input sources to supply electricity to the load 900. In one embodiment, the power supply system 200 may further comprise a detecting circuit (not shown) which is configured to detect the status of the first input source 700. When it is detected that the first input source 700 has suddenly failed or become damaged, the detecting circuit may output an actuating signal to the control circuit 230, and then the control circuit 230 can control the (N−1) remaining input sources to supply electricity to the load 900.

Figure 18:
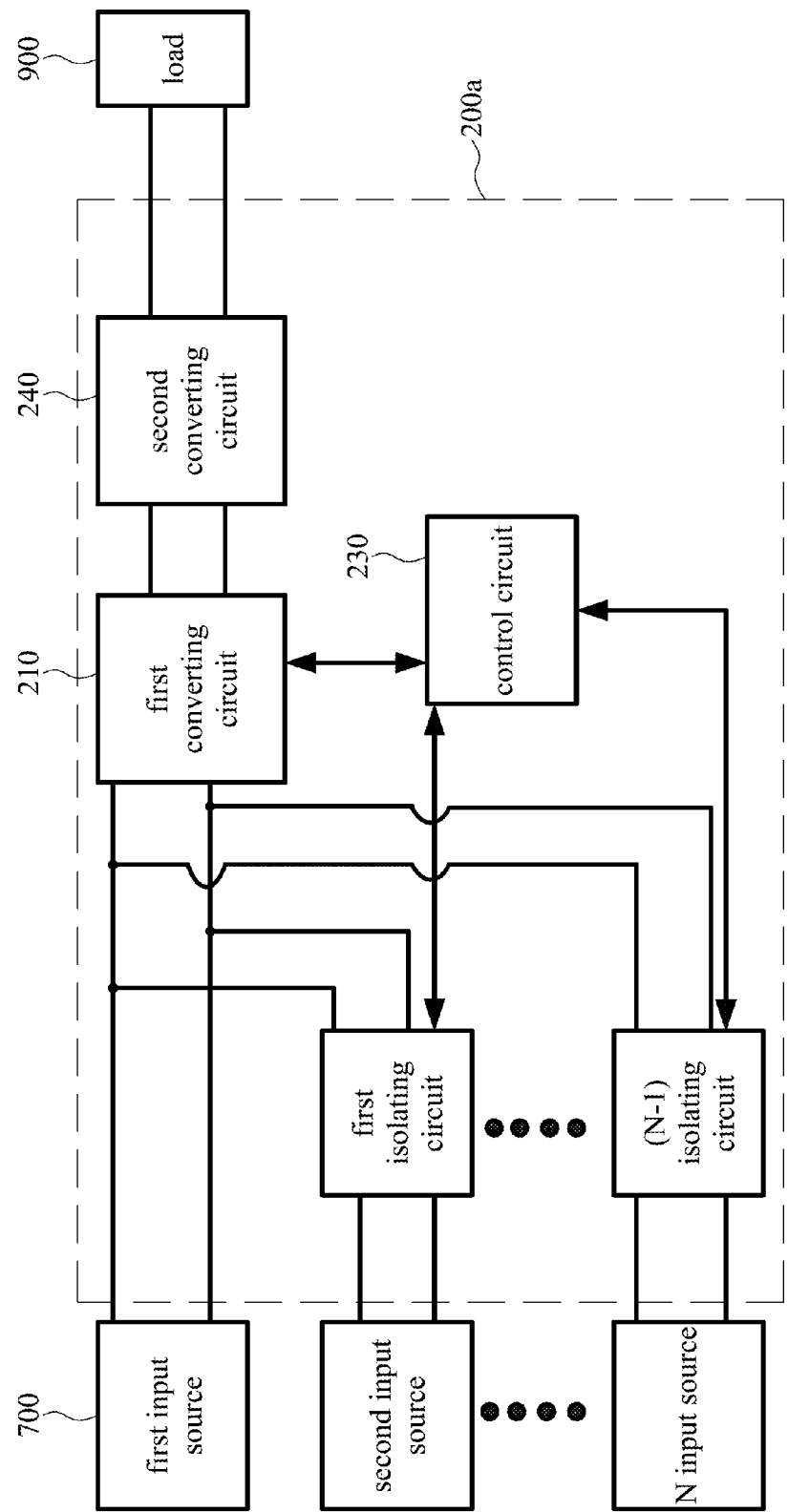
FIG. 18 is a schematic diagram of a power supply system according to another embodiment of the present disclosure.

FIG. 18 is a schematic diagram of a power supply system 200a according to another embodiment of the present disclosure. As compared with the power supply system 200 of FIG. 17, the power supply system 200a further comprises a second converting circuit 240. The second converting circuit 240 is electrically coupled between the first converting circuit 210 and the load 900, and is configured to convert the direct current outputted by the first converting circuit 210 to an alternating current, and supply to the load 900. In this way, the power supply system 200a according to this embodiment can not only reliably supply direct current to the load 900, but also supply alternating current to the load 900, thereby maybe expanding the field of application of the present power supply system 200a.

In the present embodiment, the second converting circuit 240 may be both a DC/DC converting circuit and a DC/AC converting circuit; accordingly, in practice, the second converting circuit 240 may convert direct current into direct current of a different voltage, or convert direct current into an alternating current, etc. Moreover, the second converting circuit 240 may be an isolation-type converting circuit or a non-isolation-type converting circuit, depending on actual needs.

Figure 19:
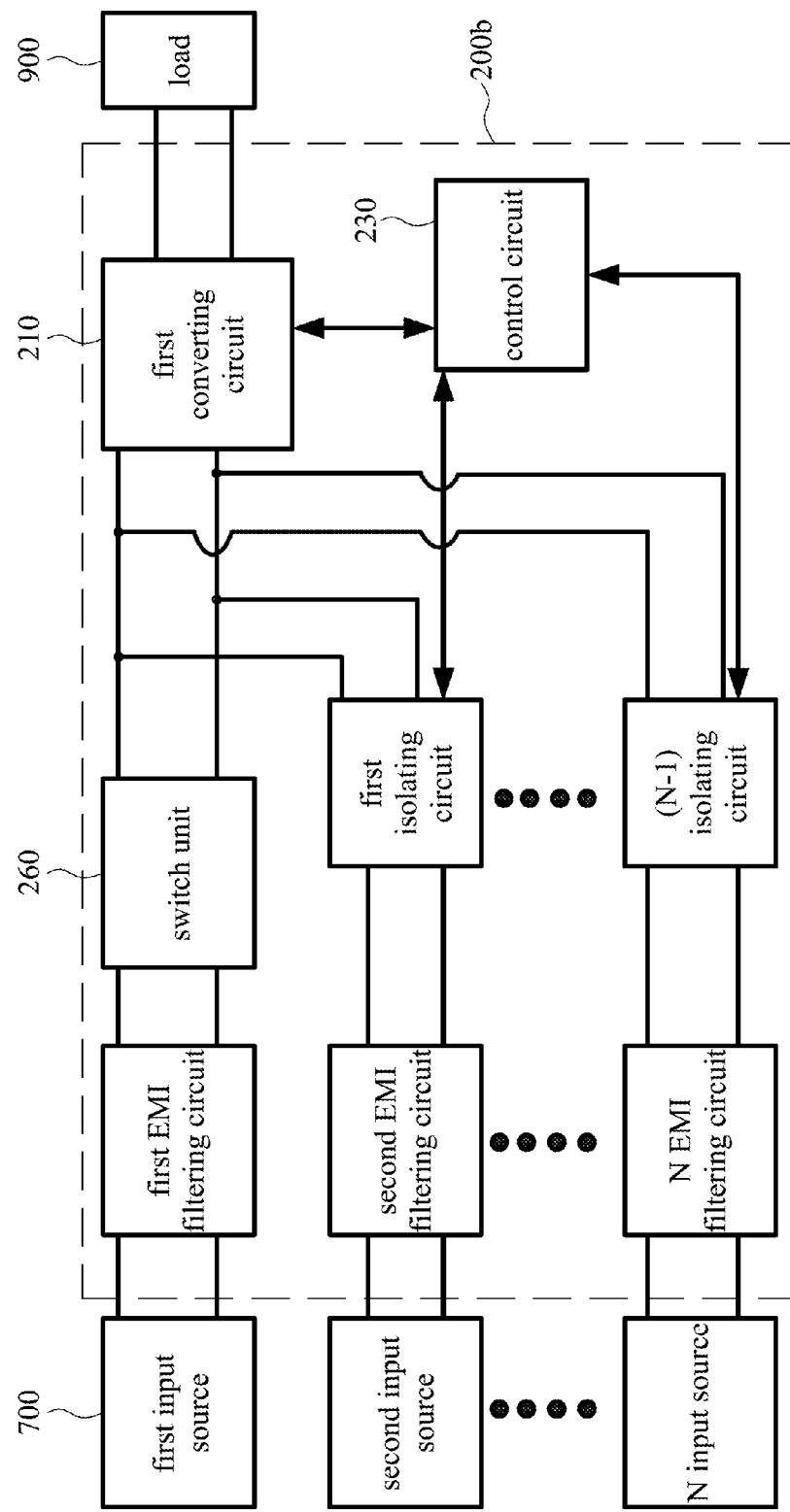
FIG. 19 is a schematic diagram of a power supply system according to yet another embodiment of the present disclosure.

FIG. 19 is a schematic diagram of a power supply system 200b according to yet another embodiment of the present disclosure. As compared to the power supply system 200 of FIG. 17, the power supply system 200b further comprises a plurality of EMI filtering circuit and a switch unit 260. The first EMI filtering circuit is coupled to the first input source 700 and the switch unit 260; meanwhile, the first EMI filtering circuit may be coupled to the first converting circuit 210 via the switch unit 260, and is configured to filter the alternating current or direct current outputted by the first input source 700. The second EMI filtering circuit to the N EMI filtering circuit can also be coupled to the (N−1) remaining input sources and the (N−1) isolating circuits respectively, and are configured to respectively filter the alternating current or direct current outputted by the (N−1) remaining input sources. However the present disclosure is not limited to the configuration illustrated in FIG. 19. For example, in one embodiment, the switch unit 260 may be coupled to the first converting circuit 210 and the first input source 700.

In the present embodiment, the switch unit 260 may be coupled between one of these EMI filtering circuits and the first converting circuit 210. The control circuit 230 is further configured to detect whether the first input source 700 is abnormal, and when the first input source 700 is abnormal, the control circuit 230 may turn off the switch unit 160, so as to prevent current from flowing reversely to the first input source 700. However, when the first input source 700 is normal, the switch unit 260 can still be turned on, and is configured to connect the front end circuit and the back end circuit.

Figure 20:
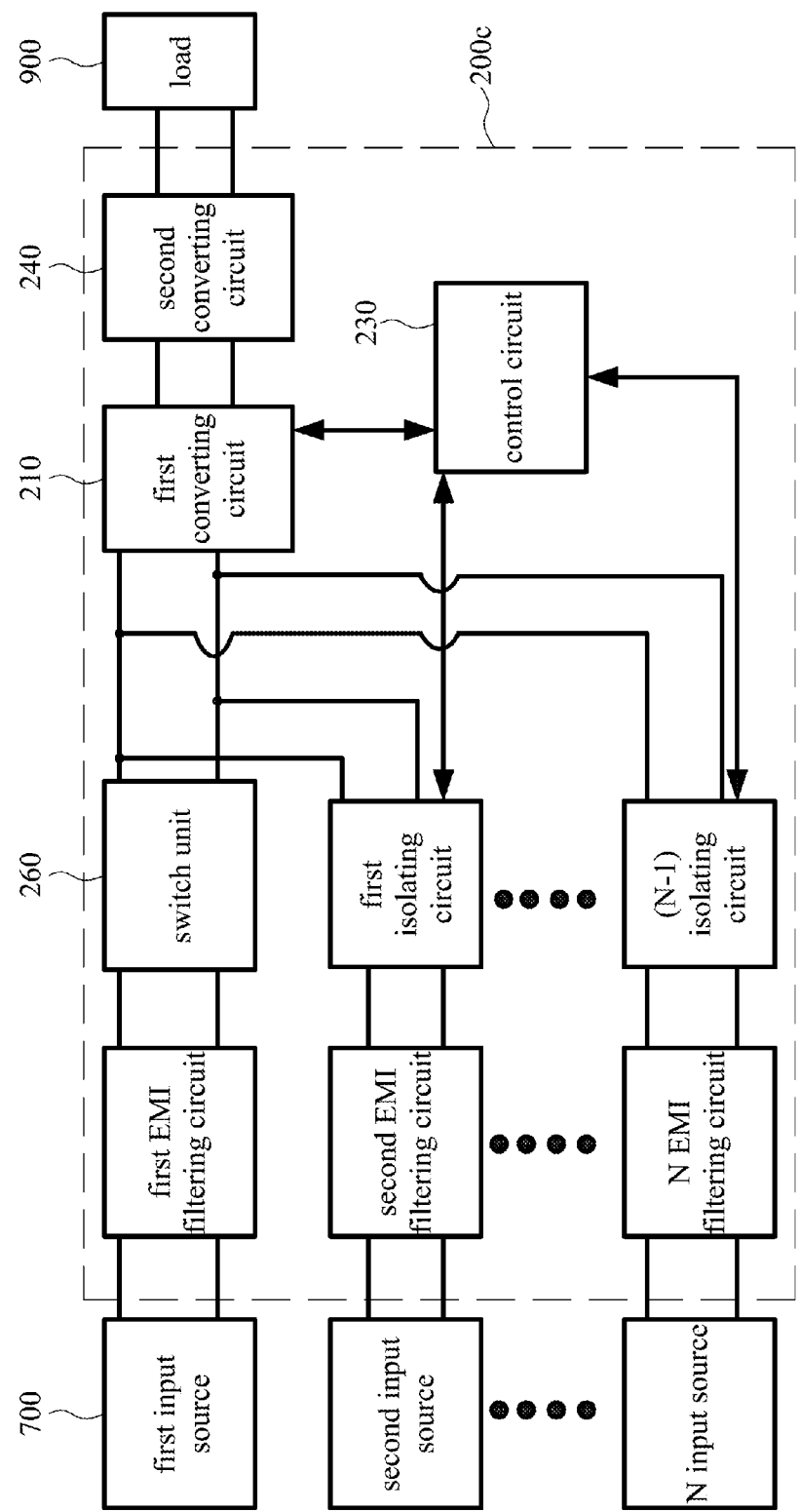
FIG. 20 is a schematic diagram of a power supply system according to still another embodiment of the present disclosure.

FIG. 20 is a schematic diagram of a power supply system 200c according to still another embodiment of the present disclosure. As compared to the power supply system 200b of FIG. 19, the power supply system 200c further comprises a second converting circuit 240. The electrical connection of the second converting circuit 240 of FIG. 20 is similar to the electrical connection of the second converting circuit 240 of FIG. 18, and for the sake of brevity, a detailed description thereof is omitted herein. Further, the illustration of FIG. 20 is provided to present a different structural arrangement of the present power supply system; however the present disclosure is not limited to configuration of the power supply system 200c shown in FIG. 20.

Figure 21:
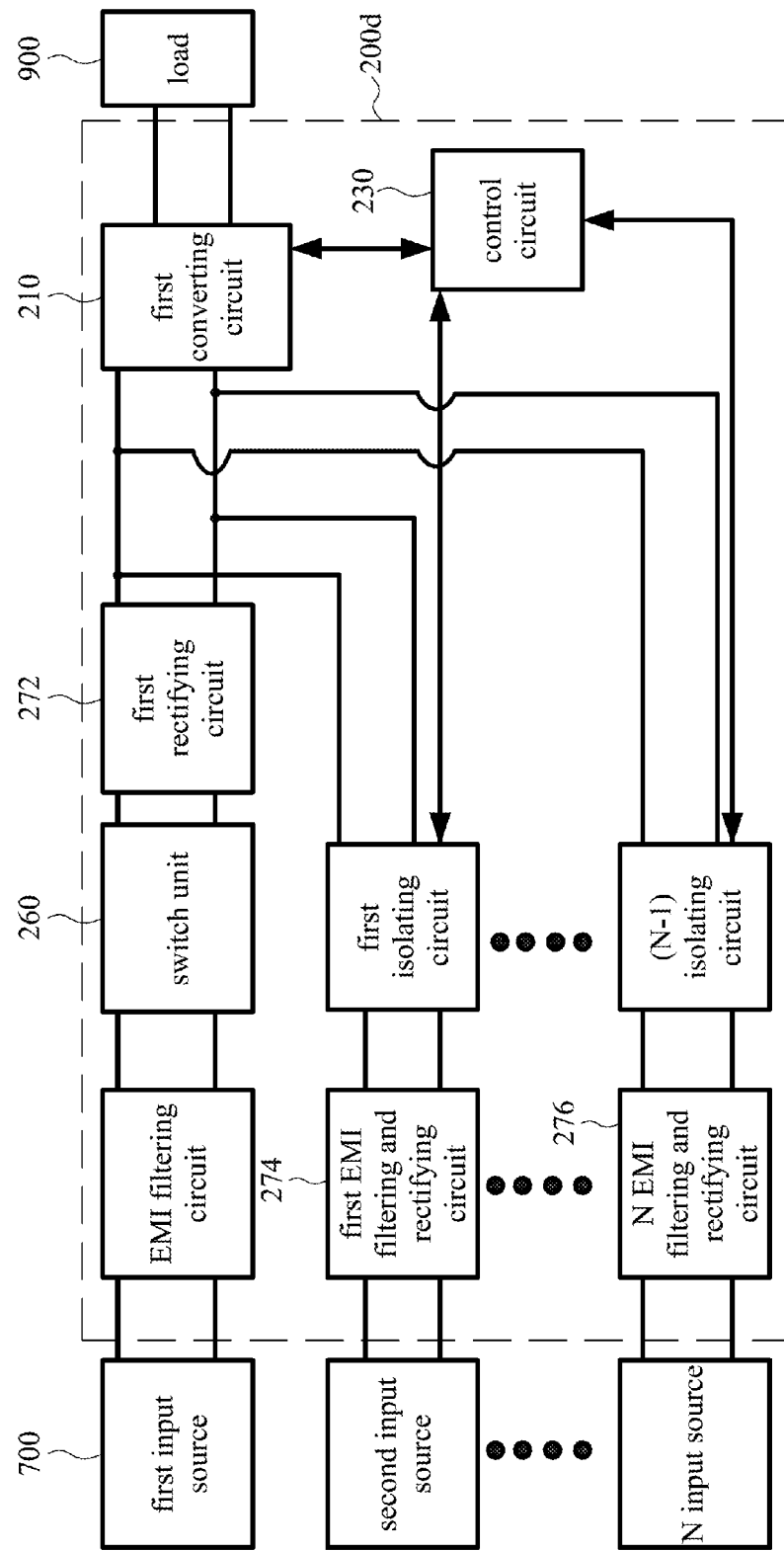
FIG. 21 is a schematic diagram of a power supply system according to another embodiment of the present disclosure.

FIG. 21 is a schematic diagram of a power supply system 200d according to still another embodiment of the present disclosure. As compared to the power supply system 200b of FIG. 19, the power supply system 200d further comprises a plurality of rectifying circuits, such as the first rectifying circuit 272, the rectifying circuit in the first EMI filtering and rectifying circuit 274, and the rectifying circuit in the (N−1) EMI filtering and rectifying circuit 276. One of these rectifying circuits (e.g., a first rectifying circuit 272) is coupled to the switch unit 260 and the first converting circuit 210, and is configured to rectify the alternating current or direct current outputted by the first input source 700, and other rectifying circuits can be coupled with the first isolating circuit to the (N−1) isolating circuit respectively. Any of these rectifying circuits can also be integrated with corresponding one(s) of the EMI filtering circuits to form a combined circuit(s), namely, an EMI filtering and rectifying circuit(s). In an embodiment, (N−1) EMI filtering and rectifying circuits may be coupled to the corresponding (N−1) remaining input sources and the (N−1) isolating circuits respectively, and are configured to rectify the alternating current or direct current outputted by the (N−1) remaining input sources. However, the present invention is not intended to be limited to the foregoing embodiment.

Figure 22:
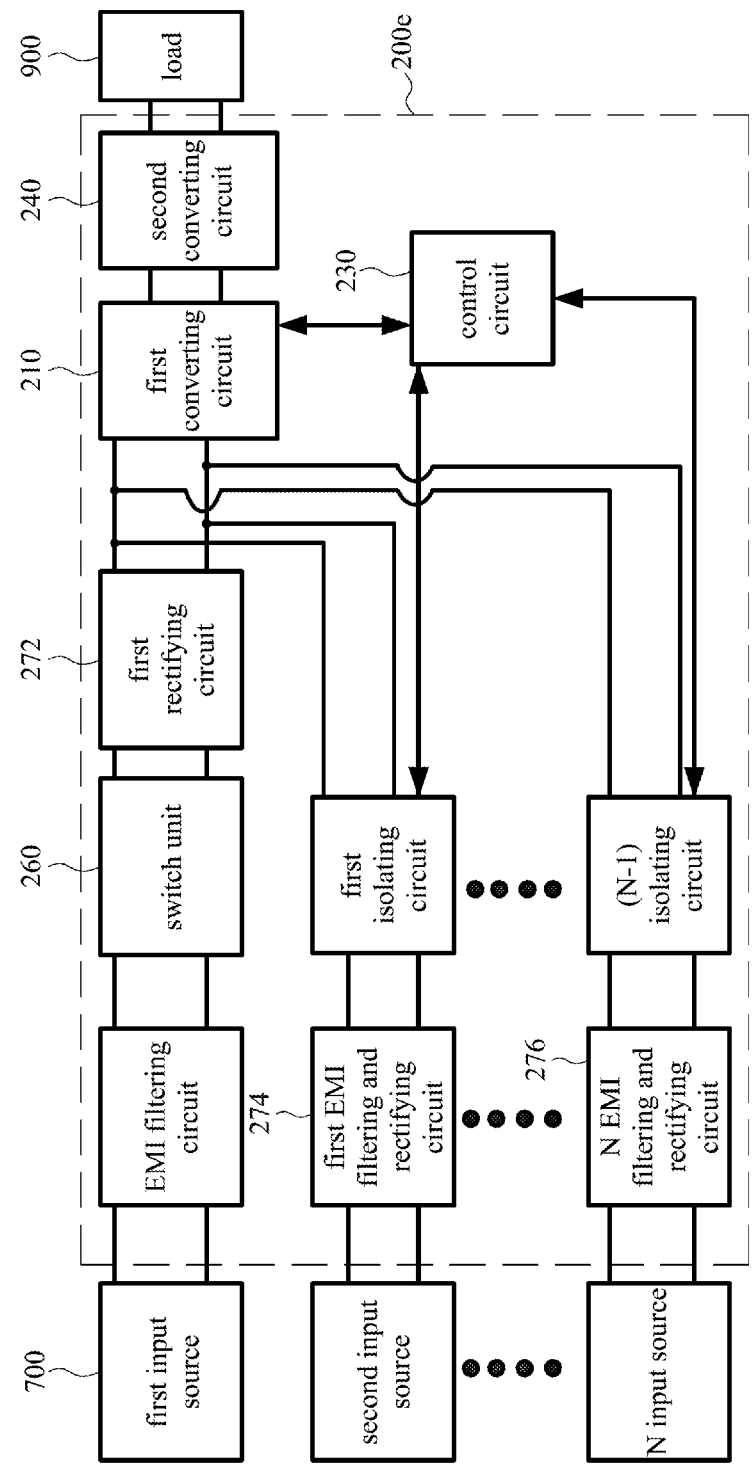
FIG. 22 is a schematic diagram of a power supply system according to yet another embodiment of the present disclosure.

FIG. 22 is a schematic diagram of a power supply system 200e according to yet another embodiment of the present disclosure. In comparison with the power supply system 200d of FIG. 21, the power supply system 200e further comprises a second converting circuit 240. The electrical connection of the second converting circuit 240 of FIG. 22 is similar to the electrical connection of the second converting circuit 240 of FIG. 18, and hence, for the sake of brevity, a detailed description thereof is omitted herein. Further, the illustration of FIG. 22 is provided to present a different structural arrangement of the present power supply system; however the present disclosure is not limited to the configuration of the power supply system 200e shown in FIG. 22.

Figure 23:
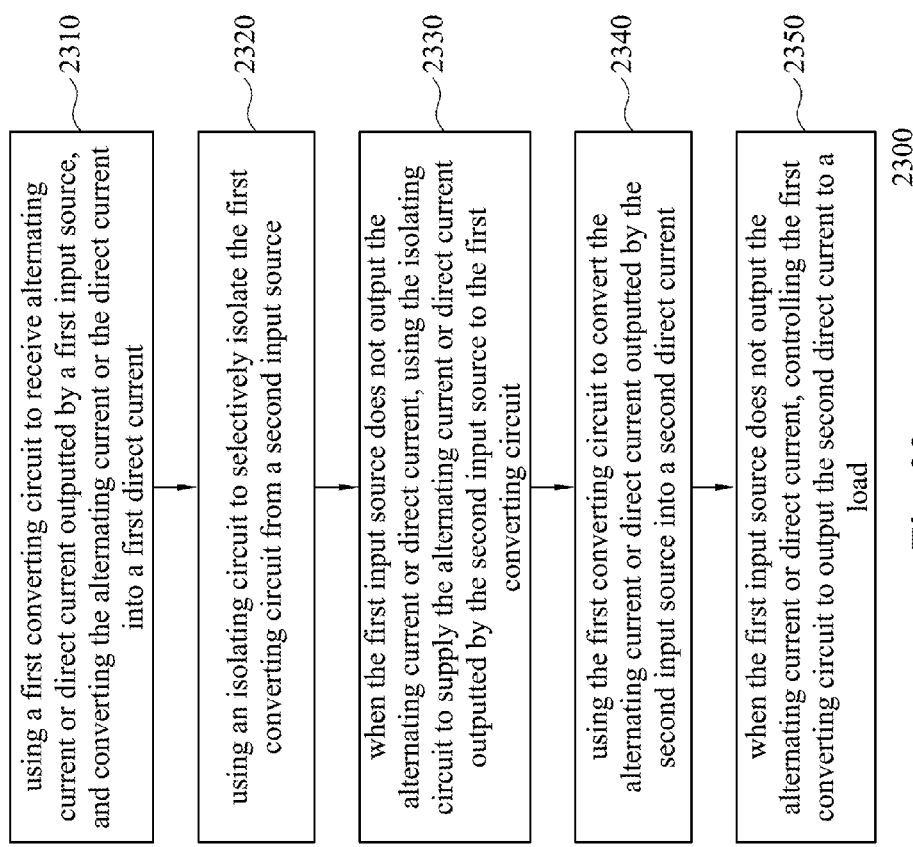
FIG. 23 is a flow chart illustrating the process steps of a method for supplying power according to one embodiment of the present disclosure.

FIG. 23 is a flow chart illustrating the process steps of a method for supplying power 2300 according to one embodiment of the present disclosure. To facilitate the understanding of the method for supplying power 2300, reference is made to both FIG. 1 and FIG. 23 which illustratively describe the process steps of the method for supplying power 2300. As illustrated in FIG. 23, the method for supplying power 2300 comprises the steps of:

Step 2310: using a first converting circuit to receive alternating current or direct current outputted by a first input source, and converting the alternating current or the direct current into a first direct current;

Step 2320: using an isolating circuit to selectively isolate the first converting circuit from a second input source;

Step 2330: when the first input source does not output the alternating current or direct current, using the isolating circuit to supply the alternating current or direct current outputted by the second input source to the first converting circuit;

Step 2340: using the first converting circuit to convert the alternating current or direct current outputted by the second input source into a second direct current; and Step 2350: when the first input source does not output the alternating current or direct current, controlling the first converting circuit to output the second direct current to a load.

In Step 2310, regarding the circuit structure, since the first converting circuit 110 may be electrically coupled to the first input source 700, the first converting circuit 110 may be configured to receive and convert the alternating current or direct current outputted by the first input source 700 into the first direct current. In Step 2320, regarding the circuit structure, since the isolating circuit 120 is electrically coupled to the second input source 800 and the first converting circuit 110, the isolating circuit 120 may selectively isolate the first converting circuit 110 from the second input source 800. However, the above description is not intended to limit the scope of the present invention; rather, it is provided to illustrate one implementation of the method for supplying power 2300.

In Step 2330, when the first input source 700 does not output alternating current or direct current, the isolating circuit 120 supplies the alternating current or direct current outputted by the second input source 800 to the first converting circuit 110. In Step 2340, the first converting circuit 110 may be configured to convert the alternating current or direct current outputted by the second input source 800 into the second direct current. In Step 2350, the control circuit 130 may be configured to control the first converting circuit 110 to output second direct current converted from the second input source 800 to the load 900. However, the above description is not intended to limit the scope of the present invention; rather, it is provided to illustrate one implementation of the method for supplying power 2300.

In this way, regardless of whether the electricity outputted by the first input source 700 is an alternating current or direct current, and regardless of whether the electricity outputted by the second input source 800 is an alternating current or direct current, with the operations of the method for supplying power 2300, the output(s) can be effectively converted into a direct current, so as to supply the direct current to the load 900. In this way, the method for supplying power 2300 of this embodiment may improve the existing problem that the dual-supply rectifying power supply is not compatible with the alternating current and direct current at the same time.

Moreover, through the operation of the method for supplying power 2300, the first input source 700 and the second input source 800 may be effectively isolated from each other. Accordingly, the existing problems caused by the use of a switch of a special specification in dual-supply rectifying power supplies may also be solved. Moreover, the method for supplying power 2300 according to this embodiment may only require a single converting circuit, and it may further increase the operation efficiency of the element.

Further, through the operation of the method for supplying power 2300, when the first input source 700 does not output alternating current or direct current, the first converting circuit 110 is controlled to output the second direct current converted from the second input source 800 to the load 900. In this way, even if the first input source 700 fails or is damaged and hence cannot output alternating current or direct current, the method for supplying power 2300 may still supply electricity to the load 900 through the second input source 800; accordingly, the method for supplying power 2300 may ensure the reliable and continuous supply of electricity.

In one embodiment, the method for supplying power 2300 further comprises the step of:

when the first input source outputs an alternating current or direct current, controlling the first converting circuit to output the first direct current to the load.

In the above step, when the first input source 700 outputs the alternating current or direct current normally, the control circuit 130 may first control the first converting circuit 110 to output the first direct current to the load 900.

In another embodiment, the method for supplying power 2300 further comprises the step of:

using a second converting circuit to convert the first direct current or the second direct current outputted by the first converting circuit into the alternating current or a third direct current, and supply the alternating current or the third direct current to the load.

To facilitate the understanding of the above step, reference is made to both FIG. 2 and FIG. 23, in which the second converting circuit 140 may be electrically coupled to the first converting circuit 110 and load 900, and therefore, the second converting circuit 140 may be configured to convert the first direct current or the second direct current outputted by the first converting circuit 110 into an alternating current or a third direct current, and supply to the load 900.

In another embodiment, the method for supplying power 2300 further comprises the steps of:

using a first EMI filtering circuit to filter the alternating current or direct current outputted by the first input source; and using a second EMI filtering circuit to filter the alternating current or direct current outputted by the second input source.

To facilitate the understanding of the above step, reference is made to both FIG. 3 and FIG. 23, in which the first EMI filtering circuit 152 may be coupled to the first input source 700 and the first converting circuit 110, and therefore, the first EMI filtering circuit 152 may be configured to filter the alternating current or direct current outputted by the first input source 700. Moreover, the second EMI filtering circuit 154 may be coupled to the second input source 800 and the isolating circuit 120, and therefore, the second EMI filtering circuit 154 may be configured to filter the alternating current or direct current outputted by the second input source 800.

In yet another embodiment, the method for supplying power 2300 further comprises the steps of:

using a first rectifying circuit to rectify the alternating current or direct current outputted by the first input source; and using a second rectifying circuit to rectify the alternating current or direct current outputted by the second input source.

To facilitate the understanding of the above steps, reference to both FIG. 8 and FIG. 23, in which the first rectifying circuit 172 may be coupled to the first input source 700 and the first converting circuit 110; therefore, the first rectifying circuit 172 may be configured to rectify the alternating current outputted by the first input source 700. Moreover, the second rectifying circuit 174 is coupled to the second input source 800 and the isolating circuit 120; therefore, the second rectifying circuit 174 may be configured to rectify the alternating current outputted by the second input source 800.

In still another embodiment, the method for supplying power 2300 further comprises the step of:

detecting whether the alternating current or direct current outputted by the first input source is abnormal, and when the alternating current or direct current outputted by the first input source is abnormal, stopping supply of the alternating current or direct current outputted by the first input source to the first converting circuit.

To facilitate the understanding of the above step, reference is made to both FIG. 5 and FIG. 23, in which the control circuit 130 is further configured to detect whether the first input source 700 is abnormal. When first input source 700 is abnormal, the control circuit 130 turns off the switch unit 160, so as to stop the supply of the alternating current or direct current outputted by the first input source 700 to the first converting circuit 110, so as to prevent current from flowing reversely to the first input source 700, but the present disclosure is not limited to this.

Moreover, persons having ordinary skill in the art should understand that the steps of the method for supplying power 2300 are named after the function thereof so as to facilitate the understanding of the present disclosure, and is not intended to limit these steps. Integrating the steps into a single step or splitting one step into multiple steps, and replacing any step by another step, may be deemed to be a part of the implementation of the present disclosure.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A power supply system, comprising:

an isolating circuit comprising an input terminal and an output terminal, wherein the input terminal of the isolating circuit is configured to connect with a second input source and receive alternating current or direct current outputted from the second input source;

a first converting circuit comprising an input terminal and an output terminal, wherein the input terminal of the first converting circuit is configured to connect with a first input source and the output terminal of the isolating circuit, and the first converting circuit is configured to convert electricity to output an outputting direct current; and an auxiliary power supply circuit comprising at least one master auxiliary power supply and at least one slave auxiliary power supply, wherein each of the at least one master auxiliary power supply and the slave auxiliary power supply comprises at least one input terminal and at least one output terminal, and is configured to supply power to a control circuit.

2. The power supply system of claim 1, further comprising:

a control circuit connecting the first converting circuit and the isolating circuit, and when the first input source does not output the alternating current or direct current, the control circuit is configured to control the first converting circuit to convert the alternating current or direct current outputted by the second input source into the outputting direct current and output the outputting direct current to a load.

3. The power supply system of claim 1, further comprising:

a control circuit connecting the first converting circuit and the isolating circuit, and when the first input source outputs the alternating current or direct current, the control circuit is configured to control the first converting circuit to convert the alternating current or direct current outputted by the first input source into the outputting direct current and output the outputting direct current to a load.

4. The power supply system of claim 1, further comprising:

a control circuit connecting the first converting circuit and the isolating circuit, and when the first input source and the second input source output the alternating current or direct current, the control circuit is configured to control the first converting circuit to convert the alternating current or direct current outputted by the first input source into the outputting direct current and output the outputting direct current to a load.

5. The power supply system of claim 1, wherein the isolating circuit comprises an isolating transformer and at least one switching element, wherein the switching element is operated at a frequency, and the frequency is equal to or higher than 1 kHz, or the frequency is greater than 50 times the frequency of the alternating current outputted by the second input source.

6. The power supply system of claim 1, further comprising:

a second converting circuit configured to convert the outputting direct current outputted by the first converting circuit into alternating current or direct current and output the alternating current or direct current outputted by the second converting circuit to a load.

7. The power supply system of claim 1, further comprising:

a first electromagnetic interference (EMI) filtering circuit coupled to the first input source and the first converting circuit, and configured to filter the alternating current or direct current outputted by the first input source; and a second EMI filtering circuit coupled to the second input source and the isolating circuit, and configured to filter the alternating current or direct current outputted by the second input source.

8. The power supply system of claim 1, further comprising:
a first rectifying circuit coupled to the first input source and the first converting circuit, and configured to rectify the alternating current or direct current outputted by the first input source; and
a second rectifying circuit coupled to the second input source and the isolating circuit, and configured to rectify the alternating current or direct current outputted by the second input source.

9. The power supply system of claim 1, further comprising:
a switch unit coupled to the first input source and the first converting circuit, wherein when the first input source is normal, the switch unit is turned on, and when the first input source is abnormal, the switch unit is turned off.

10. The power supply system of claim 7, further comprising:
a switch unit coupled to the first input source and the first converting circuit, wherein, when the first input source is normal, the switch unit is turned on, and when the first input source is abnormal, the switch unit is turned off; and
an auxiliary power supply circuit comprising at least one master auxiliary power supply and at least one slave auxiliary power supply, wherein each of the at least one master auxiliary power supply and the slave auxiliary power supply comprises at least one input terminal and at least one output terminal, and is configured to supply power to a control circuit, wherein the at least one slave auxiliary power supply is coupled to the first EMI filtering circuit, the second EMI filtering circuit or the switch unit.

11. The power supply system of claim 1, wherein the at least one master auxiliary power supply is coupled to the output terminal of the first converting circuit, the first input source and the second input source.

12. The power supply system of claim 1, wherein the at least one output terminal of the master auxiliary power supply and the at least one output terminal of the slave auxiliary power supply are in parallel connection to supply power to a control circuit.

13. The power supply system of claim 1, wherein the master auxiliary power supply and the slave auxiliary power supply comprise a multi-output isolating circuit.

14. A method for supplying power, comprising:
using a first converting circuit to receive alternating current or direct current outputted by a first input source, and converting the alternating current or the direct current outputted by a first input source into a first direct current;
using an isolating circuit to selectively isolate the first converting circuit from a second input source;
when the first input source does not output the alternating current or direct current, using the isolating circuit to supply the alternating current or direct current outputted by the second input source to the first converting circuit;
using the first converting circuit to convert the alternating current or direct current outputted by the second input source into a second direct current;
when the first input source does not output the alternating current or direct current, controlling the first converting circuit to output the second direct current to a load; and
supplying, by an auxiliary power supply circuit comprising at least one master auxiliary power supply and at least one slave auxiliary power supply, power to a control circuit, wherein each of the at least one master auxiliary power supply and the slave auxiliary power supply comprises at least one input terminal and at least one output terminal.

15. The method for supplying power of claim 14, further comprising:
when the first input source outputs the alternating current or direct current, controlling the first converting circuit to output the first direct current to the load.

16. The method for supplying power of claim 14, further comprising:
using a second converting circuit to convert the first direct current or the second direct current outputted by the first converting circuit into alternating current or a third direct current, and supply the alternating current or the third direct current outputted by the second converting circuit to the load.

17. The method for supplying power of claim 14, further comprising:
using a first EMI filtering circuit to filter the alternating current or direct current outputted by the first input source; and
using a second EMI filtering circuit to filter the alternating current or direct current outputted by the second input source.

18. The method for supplying power of claim 14, further comprising:
using a first rectifying circuit to rectify the alternating current or direct current outputted by the first input source; and
using a second rectifying circuit to rectify the alternating current or direct current outputted by the second input source.

19. The method for supplying power of claim 14, further comprising:
detecting whether the alternating current or direct current outputted by the first input source is abnormal, and when the alternating current or direct current outputted by the first input source is abnormal, stopping supplying the alternating current or direct current outputted by the first input source to the first converting circuit.

* * * * *